United States Patent
Kuroki et al.

(10) Patent No.: US 10,072,193 B2
(45) Date of Patent: Sep. 11, 2018

(54) FILLING METHOD USING MIXED REFRIGERANT INCLUDING TRANS-1, 3, 3, 3-TETRAFLUOROPROPENE

(71) Applicant: DAIKIN INDUSTRIES, LTD., Osaka (JP)

(72) Inventors: Hitomi Kuroki, Osaka (JP); Yasufu Yamada, Osaka (JP); Tatsumi Tsuchiya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 147 days.

(21) Appl. No.: 15/123,470

(22) PCT Filed: Mar. 4, 2015

(86) PCT No.: PCT/JP2015/056427
§ 371 (c)(1),
(2) Date: Oct. 11, 2016

(87) PCT Pub. No.: WO2015/133548
PCT Pub. Date: Sep. 11, 2015

(65) Prior Publication Data
US 2017/0081575 A1  Mar. 23, 2017

(30) Foreign Application Priority Data
Mar. 4, 2014 (JP) ................................. 2014-042163

(51) Int. Cl.
*F25B 45/00* (2006.01)
*C09K 5/04* (2006.01)

(52) U.S. Cl.
CPC .............. *C09K 5/045* (2013.01); *F25B 45/00* (2013.01); *C09K 2205/122* (2013.01); *C09K 2205/126* (2013.01); *C09K 2205/22* (2013.01); *F25B 2400/121* (2013.01)

(58) Field of Classification Search
CPC ..... C09K 5/045; F25B 45/00; F25B 2400/121
See application file for complete search history.

(56) References Cited

U.S. PATENT DOCUMENTS

| 6,018,952 A | 2/2000 | Ide et al. |
|---|---|---|
| 6,058,717 A | 5/2000 | Ide et al. |
| 2010/0122545 A1* | 5/2010 | Minor ...................... C08J 9/146 62/324.1 |
| 2011/0095224 A1 | 4/2011 | Rached |

FOREIGN PATENT DOCUMENTS

| CA | 2 674 256 | 1/2010 |
|---|---|---|
| EP | 0 979 855 | 2/2000 |
| JP | 10-197108 | 7/1998 |
| JP | 3186065 | 5/2001 |
| JP | 2010-47754 | 3/2010 |
| JP | 2011-522947 | 8/2011 |
| JP | 2011-525204 | 9/2011 |
| WO | 2010/002014 | 1/2010 |
| WO | 2014/031949 | 2/2014 |

OTHER PUBLICATIONS

International Search Report dated Jun. 2, 2015 in International (PCT) Application No. PCT/JP2015/056427.
Extended European Search Report dated Nov. 24, 2017 for corresponding European Application No. 15757913.7.

* cited by examiner

*Primary Examiner* — Christopher R Zerphey
(74) *Attorney, Agent, or Firm* — Wenderoth, Lind & Ponack, L.L.P.

(57) ABSTRACT

An object of the present invention is to provide a method for filling a refrigerant mixture. This method enables composition changes of a non-azeotropic refrigerant mixture comprising HFO-1234ze(E) and HFC-32 during the transfer to fall within an acceptable range of refrigerant performance. The method for filling a refrigerant mixture comprising HFC-32 and HFO-1234ze(E), the HFC-32 being present in a liquid phase of the refrigerant mixture in an amount of 10 to 90 wt % based on 100 wt % of the total of the HFC-32 and HFO-1234ze(E), comprises, in transferring the refrigerant mixture in a liquid state to a target container or equipment from a feeding container, adjusting the proportion (initial composition) of the HFC-32 in the liquid phase of the refrigerant mixture in the feeding container immediately before the transfer to $x+y_1$ (minimum value) to x wt % (target upper-limit composition), so that the proportion of the HFC-32 in the liquid phase of the refrigerant mixture in the feeding container falls within a range from the target upper-limit composition (x) of the HFC-32 to the target upper-limit composition (x)—4.0 wt % (target lower-limit composition) during initiation and completion of the transfer.

3 Claims, No Drawings

FILLING METHOD USING MIXED REFRIGERANT INCLUDING TRANS-1, 3, 3, 3-TETRAFLUOROPROPENE

TECHNICAL FIELD

The present invention relates to a method for filling a refrigerant mixture comprising trans-1,3,3,3-tetrafluoropropene.

BACKGROUND ART

Recently, review of refrigerants is progressing in the fields of refrigeration and air conditioning from the viewpoint of preventing global warming. In the field of car air conditioners, refrigerants with a global warming potential (GWP) of 150 or more are regulated by the EU F-Gas Regulation. Then 2,3,3,3-tetrafluoropropene (also referred to as "HFO-1234yf" in the present specification) that has a GWP of 4 has been used. Moreover, in the field of large refrigeration and air-conditioning systems, trans-1,3,3,3-tetrafluoropropene (also referred to as "HFO-1234ze(E)" in the present specification) is, in addition to the HFO-1234yf mentioned above, also considered an alternative candidate.

As for fixed-type refrigeration and air-conditioning systems, currently used refrigerants, such as R-410A (GWP: 2,088), R-404A (GWP: 3,922), R-407C (GWP: 1,770), and 1,1,1,2-tetrafluoroethane (also referred to as "HFC-134a" in the present specification) (GWP: 1,430), have high GWP and are thus being regulated in developed countries from the viewpoint of not only cutting $CO_2$, but also reducing HFC (hydrofluorocarbons or fluorinated hydrocarbons). The development of alternative refrigerants is an urgent issue. Refrigerants should be selected from various refrigerants, taking into consideration the application, operating conditions, and other conditions, from multiple viewpoints, including environmental friendliness, safety, performance, and economic efficiency. Various types of refrigerants are currently proposed, together with fluorocarbon and natural refrigerants; however, currently no refrigerants satisfy all requirements, including flammability, efficiency, and GWP value. It is necessary to select the right refrigerant for the right place, depending on the application, operating conditions, and other conditions.

Among refrigerants, HFO-1234ze(E) refrigerants have attracted attention because of their low GWP and low toxicity in fields other than the field of large refrigeration and air-conditioning systems. However, as alternatives to R-410A and other refrigerants for use, for example, in fixed-type refrigeration and air-conditioning systems, HFO refrigerants alone have low vapor pressure and raise concerns of insufficient capability or performance degradation, as compared to conventional refrigerants. In addition, HFO refrigerants are known to be slightly flammable.

Accordingly, non-azeotropic refrigerant mixtures of various refrigerants have been proposed recently to improve performance and achieve non-flammability (PTL 1 to PTL 3).

However, many of the mixtures of HFC and HFO-1234ze (E) are non-azeotropic mixtures and therefore undergo composition changes during phase changes, such as evaporation and condensation. This is because low-boiling-point components are more likely to be evaporated, and high-boiling-point components are more likely to be condensed. This tendency is prominent in the case of evaporation, i.e., a phase change from liquid to vapor, and is particularly remarkable when the components of the mixture have a large difference in their boiling points. For this reason, when such a non-azeotropic mixture is transferred from a container to another container, the mixture is usually extracted from the liquid phase so as not to induce phase changes.

Nevertheless, a mixture of components that have a large difference in boiling points undergoes a composition change of a few percent, even when the mixture is extracted from the liquid phase. This is because the reduced pressure and the increased gas phase space due to the extraction of the mixture lead to evaporation of low-boiling-point components in the liquid phase. A composition change of a few percent not only causes a significant change in refrigerant performance to thereby reduce capability and efficiency, but also has a major impact on the safety of the refrigerant, such as on flammability (PTL 4 and PTL 5).

In particular, HFC-32 (difluoromethane), which is likely to be used as a refrigerant mixture with HFO-1234ze(E), has a very high refrigerating capacity; however, the difference in boiling point between HFC-32 and HFO-1234ze(E) is nearly about 30 K. Composition changes that occur during the transfer of such a refrigerant mixture from a feeding container (e.g., a gas cylinder or tank truck) to a refrigeration and air-conditioning system or other tanks are at a non-negligible level in terms of performance. Moreover, in terms of not only performance, but also quality assurance of the refrigerant mixture, it is important to control composition changes within the set tolerance of the refrigerant mixture.

For example, when a refrigerant mixture comprising HFO-1234ze(E) and HFC-32 is transferred at 40° C., without taking any measures, a composition gap of up to 3 to 4 wt % from the target composition develops when the entire liquid before transfer is extracted. In this case, the composition change rate is about ±4 wt % from the target composition, and refrigeration capacity and refrigerant capacity (e.g., COP) expected from the target composition cannot be ensured. Therefore, it is important to control the composition change rate within a range as narrow as possible.

Furthermore, composition changes significantly vary depending on the type and composition ratio of non-azeotrope refrigerant, and it is difficult to predict the range of composition changes without actual measurement.

CITATION LIST

Patent Literature

PTL 1: JP2010-47754A
PTL 2: JP2011-525204A
PTL 3: JP2011-522947A
PTL 4: JPH10-197108A
PTL 5: JP3186065B

SUMMARY OF INVENTION

Technical Problem

A primary object of the present invention is to provide a method for filling a refrigerant mixture that enables composition changes of a non-azeotropic refrigerant mixture comprising HFO-1234ze(E) and HFC-32 during the transfer of the mixture to fall within an acceptable range of refrigerant performance.

Solution to Problem

The present inventors conducted extensive research on methods for filling a liquefied gas in order to solve the problem of composition changes that occur in a non-azeotropic mixture comprising two liquefied gases having different boiling points when the mixture is stored in a hermetically sealed container and transferred from the liquid phase to another container.

Specifically, the present invention provides the following method for filling a non-azeotropic refrigerant mixture comprising HFC-32 and HFO-1234ze(E).

The method of the present invention for filling a refrigerant mixture has a feature in that in transferring an HFC-32/HFO-1234ze(E) refrigerant mixture, i.e., a non-azeotropic refrigerant, which has a composition of 10 to 90 wt % HFC-32 in the liquid phase, to a target container or equipment from a feeding container, the proportion of HFC-32 in the liquid phase within the feeding container before the transfer is adjusted to a specific range.

The mixture ratio is described below in terms of a refrigerant mixture in a feeding container before being transferred to a target container or equipment from the feeding container that is filled with the refrigerant mixture in an amount equal to a maximum filling amount (100 wt % of a maximum filling amount) of the refrigerant mixture.

The term "maximum filling amount" (100 wt % of the maximum filling amount) used herein refers to a maximum amount that can be filled into a container, as defined in international law regarding transportation or in the High Pressure Gas Safety Act of Japan. According to the High Pressure Gas Safety Act of Japan, the maximum filling amount is calculated as below:

$$G = V/C$$

G: Mass (kg) of fluorocarbon
V: Capacity (L) of the container
C: Constant according to the type of fluorocarbon The fill constant C here is determined in Japan as a value obtained by dividing 1.05 by the specific gravity of the gas at 48° C. When export is involved, according to international law, fill constant C is defined as a value obtained by dividing 1.05 by the specific gravity of the gas at 65° C. when passing through tropical regions, and it is defined as a value obtained by dividing 1.05 by the specific gravity of the gas at 45° C. when passing through only regions other than tropical regions.

In transfer of an HFC-32/HFO-1234ze(E) refrigerant mixture to a target container or equipment from a feeding container, a smaller amount of the mixture initially filled into the feeding container results in a smaller change in the composition of HFC-32 in the liquid phase of the refrigerant mixture in the feeding container during initiation and completion of the transfer.

Hereinafter, a value obtained by dividing 1.05 by the specific gravity of the gas at 45° C. is used as the fill constant, and the calculated value is considered the maximum filling amount (100 wt % of the maximum filling amount).

The present invention mainly encompasses the following aspects.

Item 1. A method (a gas transfer filling method) for filling a refrigerant mixture comprising HFC-32 and HFO-1234ze(E), the HFC-32 being present in a liquid phase of the refrigerant mixture in an amount of 10 to 90 wt % based on 100 wt % of the total of the HFC-32 and HFO-1234ze(E), the method comprising, in transferring the refrigerant mixture in a liquid state to a target container or equipment from a feeding container, adjusting the proportion (initial composition) of the HFC-32 in the liquid phase of the refrigerant mixture in the feeding container immediately before the transfer to $x+y_1$ (minimum value) to x wt % (target upper-limit composition), so that the proportion of the HFC-32 in the liquid phase of the refrigerant mixture in the feeding container falls within a range from the target upper-limit composition (x) of the HFC-32 to the target upper-limit composition (x)—4.0 wt % (target lower-limit composition) during initiation and completion of the transfer, a: an amount (wt %) initially filled in the feeding container ($60 \leq a \leq 100$);

x: a target upper-limit composition with the proviso that $10 \leq x \leq 90$, excluding a range satisfying an inequality: $y_1 > 0$; and $y_1$: a lower limit of a gap between the target upper-limit composition and the initial composition, $y_1$ being represented by Equation (1) below:

$$1000y_1 = L_1 x^3 - M_1 x^2 + N_1 x - P_1 \quad (1)$$

$L_1 = 0.0006\ a + 0.0033$
$M_1 = 0.0147\ a + 1.3904$
$N_1 = 0.9026\ a + 112.55$
$P_1 = 1.1469\ a + 4464$.

Item 2. A method (a gas transfer filling method) for filling a refrigerant mixture comprising HFC-32 and HFO-1234ze(E), the HFC-32 being present in a liquid phase of the refrigerant mixture in an amount of 10 to 90 wt % based on 100 wt % of the total of the HFC-32 and HFO-1234ze(E), the method comprising, in transferring the refrigerant mixture in a liquid state to a target container or equipment from a feeding container, adjusting the proportion (initial composition) of the HFC-32 in the liquid phase of the refrigerant mixture in the feeding container immediately before the transfer to $x+y_2$ (minimum value) to x wt % (target upper-limit composition), so that the proportion of the HFC-32 in the liquid phase of the refrigerant mixture in the feeding container falls within a range from the target upper-limit composition (x) of the HFC-32 to the target upper-limit composition (x)—3.0 wt % (target lower-limit composition) during initiation and completion of the transfer, a: an amount (wt %) initially filled in the feeding container ($60 \leq a \leq 100$);

x: a target upper-limit composition with the proviso that $10 \leq x \leq 90$, excluding a range satisfying an inequality: $y_2 > 0$; and $y_2$: a lower limit of a gap between the target upper-limit composition and the initial composition, $y_2$ being represented by Equation (7) below:

$$1000y_2 = L_2 x^3 - M_2 x^2 + N_2 x - P_2 \quad (7)$$

$L_2 = 0.0006\ a + 0.0033$
$M_2 = 0.0149\ a + 1.3265$
$N_{2=0.9005}\ a + 106.38$
$P_2 = 0.8193\ a + 3287.8$.

Item 3. A method (a gas transfer filling method) for filling a refrigerant mixture comprising HFC-32 and HFO-1234ze(E), the HFC-32 being present in a liquid phase of the refrigerant mixture in an amount of 10 to 90 wt % based on 100 wt % of the total of the HFC-32 and HFO-1234ze(E), the method comprising, in transferring the refrigerant mixture in a liquid state to a target container or equipment from a feeding container, adjusting the proportion (initial composition) of the HFC-32 in the liquid phase of the refrigerant mixture in the feeding container immediately before the transfer to $x+y_3$ (minimum value) to x wt % (target upper-limit composition), so that the proportion of the HFC-32 in the liquid phase of the refrigerant mixture in the feeding container falls within a range from the target upper-limit composition (x) of the HFC-32 to the target upper-limit composition (x)—2.0 wt % (target lower-limit composition) during initiation and completion of the transfer, a: an amount (wt %) initially filled in the feeding container (60≤a≤100);

x: a target upper-limit composition with the proviso that 10≤x≤18.0 wt % or 76.0≤x≤90, excluding a range satisfying an inequality: $y_3$>0; and $y_3$: a lower limit of a gap between the target upper-limit composition and the initial composition, $y_3$ being represented by Equation (13) below:

$$1000y_3 = L_3 x^3 - M_3 x^2 + N_3 x - P_3 \quad (13)$$

$L_3$=0.0006 a+0.0033
$M_3$=0.0137 a+1.3646
$N_3$=0.8276 a+105.68
$P_3$=−0.5186 a+2205.2.

(1) Filling Method in which the Difference Between the Target Upper-Limit Composition and the Target Lower-Limit Composition is 4 wt %

The mixture ratio is described below in terms of a refrigerant mixture in a feeding container before transfer. This mixture ratio is to achieve, in transferring the refrigerant mixture to a target container or equipment from the feeding container, the proportion of the HFC-32 in the liquid phase of the refrigerant mixture in the feeding container to be within a range from a target upper-limit composition (x) of HFC-32 to the target upper-limit composition (x)—4.0 wt % (target lower-limit composition) during initiation and completion of the transfer.

The "target upper-limit composition (x)" is a maximum acceptable value in the range of the composition of HFC-32 required in a target container or equipment in the overall composition (liquid phase and vapor phase) of an HFC-32/HFO-1234ze(E) refrigerant mixture. x (wt. %) is a numerical value within the range of 10≤x≤90. The "target lower-limit composition," i.e., "(x)—4 wt %," is a minimum acceptable value in the range of the composition of HFC-32 required in a target container or equipment in the overall composition (liquid phase and vapor phase) of the HFC-32/HFO-1234ze(E) refrigerant mixture.

(1-1) Filling Method in which the Difference Between the Target Upper-Limit Composition and the Target Lower-Limit Composition is 4 wt %

In one embodiment of the method (a gas transfer filling method) of the present invention for filling a refrigerant mixture comprising HFC-32 and HFO-1234ze(E) in which the HFC-32 is present in the liquid phase in an amount of 10 to 90 wt % based on 100 wt % of the total of the HFC-32 and HFO-1234ze(E), the amount of the refrigerant mixture filled in a container is appropriately adjusted. Such a method has the following feature. Specifically, in transferring the refrigerant mixture in a liquid state into a target container or equipment from a feeding container, the proportion (initial composition) of the HFC-32 in the liquid phase of the refrigerant mixture in the feeding container immediately before the transfer is adjusted to x+$y_1$ (minimum value) to x wt % (target upper-limit composition), so that the proportion of the HFC-32 in the liquid phase of the refrigerant mixture in the feeding container falls within a range from the target upper-limit composition (x) of HFC-32-4.0 wt % (target lower-limit composition) to the target upper-limit composition (x) during initiation and completion of the transfer.

a: an amount (wt %) initially filled in the feeding container (60≤a≤100)

x: a target upper-limit composition (wt %, 10≤x≤90, excluding a range satisfying an inequality: $y_1$>0)

$y_1$: a lower limit of a gap between the target upper-limit composition and the initial composition, $y_1$ being represented by Equation (1) below:

$$1000y_1 = L_1 x^3 - M_1 x^2 + N_1 x - P_1 \quad (1)$$

$L_1$=0.0006 a+0.0033
$M_1$=0.0147 a+1.3904
$N_1$=0.9026 a+112.55
$P_1$=1.1469 a+4464.

According to the method for filling a refrigerant mixture of the present invention, the proportion of HFC-32 in the liquid phase of the mixture in a feeding container before transfer is adjusted to a specific range; therefore, even when the feeding container is filled with the refrigerant mixture in an amount equal to 100 wt % of the maximum filling amount, changes in the composition in a target container or equipment fall within a range from a target upper-limit composition (x)—4.0 wt % (target lower-limit composition) to the target upper-limit composition (x) until transfer is completed.

The boiling point of HFC-32 is lower than that of HFO-1234ze(E). Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition.

The value a above is usually set to 60≤a≤100.

Hereinafter, one example is described regarding a method that performs transfer at a handling temperature of 40° C. For example, according to the High Pressure Gas Safety Act of Japan, handling a container at a temperature of 40° C. or higher is prohibited; therefore, in Japan, the handling temperature is 0 to 40° C. when transfer is performed. A higher temperature during transfer (at the time of handling) causes a larger composition change during initiation of the transfer in a liquid state from a feeding container to a target container or equipment and completion of the transfer. Therefore, the conditions for the transfer at a handling temperature of 40° C. is applicable to the conditions for the transfer at a handling temperature ranging from 0 to 40° C.

Moreover, regarding the filling amount in a feeding container, when the refrigerant mixture in a liquid state is transferred to a target container or equipment from the feeding container, a smaller initial filling amount results in a smaller composition change associated with the transfer during initiation and completion of the transfer. Therefore, an equation that satisfies a filling method in which the initial filling amount is a wt % is also satisfied in a filling method in which the initial filling amount is a wt % or less. For example, an equation that satisfies a filling method in which the initial filling amount is 100 wt % is also satisfied in a filling method in which the initial filling amount is 100 to 0 wt %. An equation that satisfies a filling method in which the initial filling amount is 90 wt % is also satisfied in a filling method in which the initial filling amount is 90 to 0 wt %. An equation that satisfies a filling method in which the initial filling amount is 80 wt % is also satisfied in a filling method in which the initial filling amount is 80 to 0 wt %. An equation that satisfies a filling method in which the initial filling amount is 70 wt % is also satisfied in a filling method in which the initial filling amount is 70 to 0 wt %. An equation that satisfies a filling method in which the initial filling amount is 60 wt % is also satisfied in a filling method in which the initial filling amount is 60 to 0 wt %.

Proportion of HFC-32 in the Liquid Phase of the Refrigerant Mixture in a Feeding Container The present invention has a feature in that the proportion (initial composition) of HFC-32 in the liquid phase of the refrigerant mixture in a feeding container immediately before transfer is adjusted to $x+y_1$ (minimum value) to x wt % (target upper-limit composition), so that a range from the target upper-limit composition (x) of HFC-32-4.0 wt % (target lower-limit composition) to the target upper-limit composition (x) is satisfied.

x is a target upper-limit composition; $y_1$ represents a gap between the target upper-limit composition (x) and the initial composition; and $x+y_1$ is a minimum value of the proportion (initial composition) of HFC-32 in the liquid phase of the refrigerant mixture in a feeding container.

The difference between the target upper-limit composition and the target lower-limit composition is referred to as a tolerance (composition tolerance). The tolerance is determined when the composition of a refrigerant mixture is registered in the ASHRAE Standard 2013 (Designation and Safety Classification of Refrigerants) and the like.

When the mixture ratio of HFC-32 to HFO-1234ze(E) in a refrigerant mixture (HFC-32/HFO-1234ze(E)) comprising HFC-32 and HFO-1234ze(E) is, for example, 50:50 (wt %), and when the tolerance is set to be +2.0, −2.0/+2.0, or −2.0, the target upper-limit composition of HFC-32 is 52.0 wt % while the target lower-limit composition of HFC-32 is 48.0 wt %. Thus, in this refrigerant mixture, the difference between the target upper-limit composition and the target lower-limit composition is 4 wt %.

(1-2) Filling Method in which the Refrigerant Mixture is Filled into a Container in an Amount Equal to 100 wt % of the Maximum Filling Amount Hereinafter, an embodiment is described in which the refrigerant mixture is filled into a container in an amount equal to 100 wt % of the maximum filling amount of the refrigerant mixture, and in which the proportion of HFC-32 in the liquid phase falls within a range from a target upper-limit composition (x)—4.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 100 wt % of the maximum filling amount, the proportion (initial composition) of HFC-32 in the liquid phase of the refrigerant mixture in the feeding container immediately before the transfer is preferably adjusted to $x+y_1$ (minimum value) to x wt % (target upper-limit composition), so that the proportion of HFC-32 in the liquid phase of the refrigerant mixture in the feeding container falls within a range from the target upper-limit composition (x) of HFC-32-4.0 wt % (target lower-limit composition) to the target upper-limit composition (x) during initiation and completion of the transfer.

In the above, x is a target upper-limit composition, with the proviso that $10 \leq x \leq 90$.

$y_{P1}$ is a lower limit of a gap between the target upper-limit composition and the initial composition, and is represented by Equation (2) below:

$$1000 y_{P1} = 0.009 x^3 - 2.8565 x^2 + 202.202 x - 4579.154 \quad (2)$$

In this embodiment, referring to Equation (2) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—2.7 wt % to x wt %. Changes in the composition in a target container or equipment thereby fall within a range from a target upper-limit composition (x)—4.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—4.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −2.5 wt % of the target upper-limit composition, the proportion of HFC-32 in the liquid phase of the mixture falls within the range from the target upper-limit composition (x)—4.0 wt % (target lower-limit composition) to the target upper-limit composition (x) until the transfer is completed.

(1-3) Filling Method in which the Refrigerant Mixture is Filled into a Container in an Amount Equal to 90 wt % of the Maximum Filling Amount Hereinafter, an embodiment is described in which the refrigerant mixture is filled into a container in an amount equal to 90 wt % of the maximum filling amount of the refrigerant mixture and in which the proportion of HFC-32 in the liquid phase falls within a range from a target upper-limit composition (x)—4.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 90 wt % of the maximum filling amount, the proportion (initial composition) of HFC-32 in the liquid phase of the refrigerant mixture in the feeding container immediately before the transfer is preferably adjusted to $x+y_{p2}$ to x wt %, so that the proportion of HFC-32 in the liquid phase of the refrigerant mixture in the feeding container falls within a range from a target upper-limit composition (x) of HFC-32-4.0 wt % (target lower-limit composition) to the target upper-limit composition (x) during initiation and completion of the transfer.

In the above, x is a target upper-limit composition, with the proviso that $10 \leq x \leq 90$.

$y_{P2}$ is a lower limit of a gap between the target upper-limit composition and the initial composition, and is represented by Equation (3) below:

$$1000y_{P2}=0.0089x^3-2.714x^2+194.2292x-4574.474 \quad (3)$$

In this embodiment, referring to Equation (3) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—2.8 wt % to x wt %. Changes in the composition in a target container or equipment thereby falls within a range from a target upper-limit composition (x)—4.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—4.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −2.6 wt % of the target upper-limit composition, the proportion of HFC-32 in the liquid phase of the mixture falls within the range from the target upper-limit composition (x)—4.0 wt % (target lower-limit composition) to the target upper-limit composition (x) until the transfer is completed.

(1-4) Filling Method in which the Refrigerant Mixture is Filled into a Container in an Amount Equal to 80 wt % of the Maximum Filling Amount Hereinafter, an embodiment is described in which the refrigerant mixture is filled into a container in an amount equal to 80 wt % of the maximum filling amount of the refrigerant mixture and in which the proportion of HFC-32 in the liquid phase falls within a range from a target upper-limit composition (x)—4.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 80 wt % of the maximum filling amount, the proportion (initial composition) of HFC-32 in the liquid phase of the refrigerant mixture in the feeding container immediately before the transfer is preferably adjusted to $x+y_{p3}$ to x wt %, so that the proportion of HFC-32 in the liquid phase of the refrigerant mixture in the feeding container falls within a range from a target upper-limit composition (x) of HFC-32-4.0 wt % (target lower-limit composition) to the target upper-limit composition (x) during initiation and completion of the transfer.

In the above, x is a target upper-limit composition, with the proviso that 10≦x≦90.

$y_{P3}$ is a lower limit of a gap between the target upper-limit composition and the initial composition, and is represented by Equation (4) below:

$$1000y_{P3}=0.0084x^3-2.5913x^2+185.8744x-4552.951 \quad (4)$$

In this embodiment, referring to Equation (4) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—2.8 wt % to x wt %. Changes in the composition in a target container or equipment thereby falls within a range from a target upper-limit composition (x)—4.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—4.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −2.6 wt % of the target upper-limit composition, the proportion of HFC-32 in the liquid phase of the mixture falls within the range from the target upper-limit composition (x)—4.0 wt % (target lower-limit composition) to the target upper-limit composition (x) until the transfer is completed.

(1-5) Filling Method in which the Refrigerant Mixture is Filled into a Container in an Amount Equal to 70 wt % of the Maximum Filling Amount Hereinafter, an embodiment is described in which the refrigerant mixture is filled into a container in an amount equal to 70 wt % of the maximum filling amount of the refrigerant mixture and in which the proportion of HFC-32 in the liquid phase falls within a range from a target upper-limit composition (x)—4.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 70 wt % of the maximum filling amount, the proportion (initial composition) of HFC-32 in the liquid phase of the refrigerant mixture in the feeding container immediately before the transfer is preferably adjusted to $x+y_{p4}$ to x wt %, so that the proportion of HFC-32 in the liquid phase of the refrigerant mixture in the feeding container falls within a range from a target upper-limit composition (x) of HFC-32-4.0 wt % (target lower-limit composition) to the target upper-limit composition (x) during initiation and completion of the transfer.

In the above, x is a target upper-limit composition, with the proviso that $10 \le x \le 90$.

$y_{P4}$ is a lower limit of a gap between the target upper-limit composition and the initial composition, and is represented by Equation (5) below:

$$1000 y_{P4}=0.0075x^3-2.3976x^2+174.6504x-4526.37 \quad (5)$$

In this embodiment, referring to Equation (5) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—2.9 wt % to x wt %. Changes in the composition in a target container or equipment thereby falls within a range from a target upper-limit composition (x)—4.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—4.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −2.7 wt % of the target upper-limit composition, the proportion of HFC-32 in the liquid phase of the mixture falls within the range from the target upper-limit composition (x)—4.0 wt % (target lower-limit composition) to the target upper-limit composition (x) until the transfer is completed.

(1-6) Filling Method in which the Refrigerant Mixture is Filled into a Container in an Amount Equal to 60 wt % of the Maximum Filling Amount Hereinafter, an embodiment is described in which the refrigerant mixture is filled into a container in an amount equal to 60 wt % of the maximum filling amount of the refrigerant mixture and in which the proportion of HFC-32 in the liquid phase falls within a range from a target upper-limit composition (x)—4.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 60 wt % of the maximum filling amount, the proportion (initial composition) of HFC-32 in the liquid phase of the refrigerant mixture in the feeding container immediately before the transfer is preferably adjusted to $x+y_{p5}$ to x wt %, so that the proportion of HFC-32 in the liquid phase of the refrigerant mixture in the feeding container falls within a range from a target upper-limit composition (x) of HFC-32-4.0 wt % (target lower-limit composition) to the target upper-limit composition (x) during initiation and completion of the transfer.

In the above, x is a target upper-limit composition, with the proviso that $10 \le x \le 90$.

$y_{P5}$ is a lower limit of a gap between the target upper-limit composition and the initial composition, and is represented by Equation (6) below:

$$1000 y_{P5}=0.0071x^3-2.2789x^2+166.8604x-4545.862 \quad (6)$$

In this embodiment, referring to Equation (6) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—2.9 wt % to x wt %. Changes in the composition in a target container or equipment thereby falls within a range from a target upper-limit composition (x)—4.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—4.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −2.8 wt % of the target upper-limit composition, the proportion of HFC-32 in the liquid phase of the mixture falls within the range from the target upper-limit composition (x)—4.0 wt % (target lower-limit composition) to the target upper-limit composition (x) until the transfer is completed.

(1-7) Method for Filling a Non-Azeotropic Refrigerant Mixture Comprising HFC-32 and HFO-1234ze(E)

Hereinafter, an embodiment of a method for filling a non-azeotropic refrigerant mixture comprising HFC-32 and HFO-1234ze (E) in which a range from a target upper-limit composition (x) of HFC-32-4.0 wt % (target lower-limit composition) to the target upper-limit composition (x) is satisfied.

Equation (1) above may be derived from Equations (2) to (6) above. Based on the value of each coefficient of Equations (2) to (6), $L_1$ to $P_1$ of Equation (1) may be calculated from the target upper-limit composition (x) with respect to the initial filling amount (a wt %).

A method (a gas transfer filling method) of the present invention for filling a refrigerant mixture comprising HFC-32 and HFO-1234ze(E), the HFC-32 being present in a liquid phase in an amount of 10 to 90 wt % based on 100 wt % of the total of HFC-32 and HFO-1234ze(E), has the following feature. Specifically, in transferring the refrigerant mixture in a liquid state into a target container or equipment from a feeding container, the proportion (initial composition) of the HFC-32 in the liquid phase of the refrigerant mixture in the feeding container immediately before the transfer is adjusted to $x+y_1$ (minimum value) to x wt % (maximum value), so that the proportion of the HFC-32 in the liquid phase of the refrigerant mixture in the feeding container falls within a range from a target upper-limit composition (x) of HFC-32-4.0 wt % (target lower-limit composition) to the target upper-limit composition (x) during initiation and completion of the transfer.

a: an amount (wt %) initially filled in the feeding container ($60 \leq a \leq 100$);

x: a target upper-limit composition (wt %, $10 <= x <= 90$, excluding a range satisfying the inequality $y_1 > 0$); and $y_1$: a lower limit of a gap between the target upper-limit composition and the initial composition, $y_1$ being represented by Equation (1) below:

$$1000y_1 = L_1 x^3 - M_1 x^2 + N_1 x - P_1 \quad (1)$$

$L_1 = 0.0006\ a + 0.0033$
$M_1 = 0.0147\ a + 1.3904$
$N_1 = 0.9026\ a + 112.55$
$P_1 = 1.1469\ a + 4464$ (2) Filling Method in which the Difference Between the Target Upper-Limit Composition and the Target Lower-Limit Composition is 3 wt %

The mixture ratio is described below in terms of a refrigerant mixture in a feeding container before transfer. This mixture ratio is to achieve, in transferring the refrigerant mixture to a target container or equipment from the feeding container, the proportion of the HFC-32 in the liquid phase of the refrigerant mixture in the feeding container to be within a range from a target upper-limit composition (x) of HFC-32-3.0 wt % (target lower-limit composition) to the target upper-limit composition (x) during initiation and completion of the transfer.

The "target upper-limit composition (x)" is a maximum acceptable value in the range of the composition of HFC-32 required in a target container or equipment in the overall composition (liquid phase and vapor phase) of an HFC-32/HFO-1234ze(E) refrigerant mixture. x (wt. %) is a numerical value within the range of $10 \leq x \leq 90$. The "target lower-limit composition," i.e., "(x)—3 wt %," is a minimum acceptable value in the range of the composition of HFC-32 required in a target container or equipment in the overall composition (liquid phase and vapor phase) of the HFC-32/HFO-1234ze(E) refrigerant mixture.

(2-1) Filling Method in which the Difference Between the Target Upper-Limit Composition and the Target Lower-Limit Composition is 3 wt %

In one embodiment of the method (a gas transfer filling method) of the present invention for filling a refrigerant mixture comprising HFC-32 and HFO-1234ze(E) in which the HFC-32 is present in the liquid phase in an amount of 10 to 90 wt % based on 100 wt % of the total of the HFC-32 and HFO-1234ze(E), the amount of the refrigerant mixture filled in a container is appropriately adjusted. Such a method has the following feature. Specifically, in transferring the refrigerant mixture in a liquid state into a target container or equipment from a feeding container, the proportion (initial composition) of the HFC-32 in the liquid phase of the refrigerant mixture in the feeding container immediately before the transfer is adjusted to $x+y_2$ (minimum value) to x wt % (maximum value), so that the proportion of the HFC-32 in the liquid phase of the refrigerant mixture in the feeding container falls within a range from a target upper-limit composition (x) of HFC-32-3.0 wt % (target lower-limit composition) to the target upper-limit composition (x) during initiation and completion of the transfer.

a: an amount (wt %) initially filled in the feeding container ($60 \leq a \leq 100$)

x: a target upper-limit composition (wt %, $10 \leq x \leq 90$, excluding a range satisfying an inequality: $y_2 > 0$)

$y_2$: a lower limit of a gap between the target upper-limit composition and the initial composition, $y_2$ being represented by Equation (7) below:

$$1000y_2 = L_2 x^3 - M_2 x^2 + N_2 x - P_2 \quad (7)$$

$L_2 = 0.0006\ a + 0.0033$
$M_2 = 0.0149\ a + 1.3265$
$N_2 = 0.9005\ a + 106.38$
$P_2 = 0.8193\ a + 3287.8$

According to the method for filling a refrigerant mixture of the present invention, the proportion of HFC-32 in the liquid phase of the mixture in a feeding container before transfer is adjusted to a specific range; therefore, even when the feeding container is filled with the refrigerant mixture in an amount equal to 100 wt % of the maximum filling amount, changes in the composition in a target container or equipment fall within a range from a target upper-limit composition (x)—3.0 wt % (target lower-limit composition) to the target upper-limit composition (x) until transfer is completed.

The boiling point of HFC-32 is lower than that of HFO-1234ze(E). Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition.

The value a above is usually set to $60 \leq a \leq 100$.

Hereinafter, one example is described regarding a method that performs transfer at a handling temperature of 40° C. For example, according to the High Pressure Gas Safety Act of Japan, handling a container at a temperature of 40° C. or higher is prohibited; therefore, in particular, in Japan, the handling temperature is 0 to 40° C. when transfer is performed. A higher temperature during transfer (at the time of handling) causes a larger composition change during initiation of the transfer in a liquid state from a feeding container to a target container or equipment and completion of the transfer. Therefore, the conditions for the transfer at a handling temperature of 40° C. is applicable to the conditions for the transfer at a handling temperature ranging from 0 to 40° C.

Moreover, regarding the filling amount in a feeding container, when the refrigerant mixture in a liquid state is transferred to a target container or equipment from the feeding container, a smaller initial filling amount results in a smaller composition change associated with the transfer during initiation and completion of the transfer. Therefore, an equation that satisfies a filling method in which the initial filling amount is a wt % is also satisfied in a filling method in which the initial filling amount is a wt % or less. For example, an equation that satisfies a filling method in which the initial filling amount is 100 wt % is also satisfied in a filling method in which the initial filling amount is 100 to 0 wt %. An equation that satisfies a filling method in which the initial filling amount is 90 wt % is also satisfied in a filling method in which the initial filling amount is 90 to 0 wt %. An equation that satisfies a filling method in which the initial filling amount is 80 wt % is also satisfied in a filling method in which the initial filling amount is 80 to 0 wt %. An equation that satisfies a filling method in which the initial filling amount is 70 wt % is also satisfied in a filling method in which the initial filling amount is 70 to 0 wt %. An equation that satisfies a filling method in which the initial filling amount is 60 wt % is also satisfied in a filling method in which the initial filling amount is 60 to 0 wt %.

Proportion of HFC-32 in the Liquid Phase of the Refrigerant Mixture in a Feeding Container The present invention has a feature in that the proportion (initial composition) of HFC-32 in the liquid phase of the refrigerant mixture in a feeding container immediately before transfer is adjusted to $x+y_2$ (minimum value) to x wt % (target upper-limit composition), so that a range from the target upper-limit composition (x) of HFC-32-3.0 wt % (target lower-limit composition) to the target upper-limit composition (x) is satisfied.

x is a target upper-limit composition; $y_2$ represents a gap between the target upper-limit composition (x) and the initial composition; and $x+y_2$ is a minimum value of the proportion (initial composition) of HFC-32 in the liquid phase of the refrigerant mixture in a feeding container.

The difference between the target upper-limit composition and the target lower-limit composition is referred to as a tolerance (composition tolerance). The tolerance is determined when the composition of a refrigerant mixture is registered in the ASHRAE Standard 2013.

When the mixture ratio of HFC-32 to HFO-1234ze(E) in a refrigerant mixture (HFC-32/HFO-1234ze(E)) comprising HFC-32 and HFO-1234ze(E) is, for example, 50:50 (wt %), and when the tolerance is set to be +1.5, −1.5/+1.5, or −1.5, the target upper-limit composition of HFC-32 is 51.5 wt % while the target lower-limit composition of HFC-32 is 48.5 wt %. Thus, in this refrigerant mixture, the difference between the target upper-limit composition and the target lower-limit composition is 3 wt %.

(2-2) Filling Method in which the Refrigerant Mixture is Filled into a Container in an Amount Equal to 100 wt % of the Maximum Filling Amount Hereinafter, an embodiment is described in which the refrigerant mixture is filled into a container in an amount equal to 100 wt % of the maximum filling amount of the refrigerant mixture and in which the proportion of HFC-32 in the liquid phase falls within a range from a target upper-limit composition (x)—3.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 25.5 wt % or 66.5 to 90 wt % based on 100 wt % of the total of HFC-32 and HFO-1234ze (E), in transferring the refrigerant mixture in a liquid state to a target container or equipment from a feeding container that is filled with the refrigerant mixture in an amount equal to or less than 100 wt % of the maximum filling amount, the proportion (initial composition) of HFC-32 in the liquid phase of the refrigerant mixture in the feeding container immediately before the transfer is preferably adjusted to $x+y_{Q1}$ to x wt %, so that the proportion of HFC-32 in the liquid phase of the refrigerant mixture in the feeding container falls within a range from a target upper-limit composition (x) of HFC-32-3.0 wt % (target lower-limit composition) to the target upper-limit composition (x) during initiation and completion of the transfer.

In the above, x is a target upper-limit composition, with the proviso that $10 \le x \le 25.5$ or $66.5 \le x \le 90$.

$y_{Q1}$ is a lower limit of a gap between the target upper-limit composition and the initial composition, and is represented by Equation (8) below:

$$1000 y_{Q1} = 0.0093 x^3 - 2.79655 x^2 + 194.9369 x - 3361.644 \qquad (8)$$

In this embodiment, referring to Equation (8) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—1.8 wt % to x wt %. Changes in the composition in a target container or equipment thereby falls within a range from a target upper-limit composition (x)—3.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—3.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −1.6 wt % of the target upper-limit composition, the proportion of HFC-32 in the liquid phase of the mixture falls within the range from the target upper-limit composition (x)—3.0 wt % (target lower-limit composition) to the target upper-limit composition (x) until the transfer is completed.

(2-3) Filling Method in which the Refrigerant Mixture is Filled into a Container in an Amount Equal to 90 wt % of the Maximum Filling Amount Hereinafter, an embodiment is described in which the refrigerant mixture is filled into a container in an amount equal to 90 wt % of the maximum filling amount of the refrigerant mixture and in which the proportion of HFC-32 in the liquid phase falls within a range from a target upper-limit composition (x)—3.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 27.5 wt % or 64.5 to 90 wt % based on 100 wt % of the total of HFC-32 and HFO-1234ze (E), in transferring the refrigerant mixture in a liquid state to a target container or equipment from a feeding container that is filled with the refrigerant mixture in an amount equal to or less than 90 wt % of the maximum filling amount, the proportion (initial composition) of HFC-32 in the liquid phase of the refrigerant mixture in the feeding container immediately before the transfer is preferably adjusted to $x+y_{Q2}$ to x wt %, so that the proportion of HFC-32 in the liquid phase of the refrigerant mixture in the feeding container falls within a range from a target upper-limit composition (x) of HFC-32-3.0 wt % (target lower-limit composition) to the target upper-limit composition (x) during initiation and completion of the transfer.

In the above, x is a target upper-limit composition, with the proviso that $10 \leq x \leq 27.5$ or $64.5 \leq x \leq 90$.

$y_{Q2}$ is a lower limit of a gap between the target upper-limit composition and the initial composition, and is represented by Equation (9) below:

$$1000 y_{Q2} = 0.0089 x^3 - 2.69275 x^2 + 188.6282 x - 3367.314 \quad (9)$$

In this embodiment, referring to Equation (9) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—1.8 wt % to x wt %. Changes in the composition in a target container or equipment thereby falls within a range from a target upper-limit composition (x)—3.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—3.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −1.7 wt % of the target upper-limit composition, the proportion of HFC-32 in the liquid phase of the mixture falls within the range from the target upper-limit composition (x)—3.0 wt % (target lower-limit composition) to the target upper-limit composition (x) until the transfer is completed.

(2-4) Filling Method in which the Refrigerant Mixture is Filled into a Container in an Amount Equal to 80 wt % of the Maximum Filling Amount Hereinafter, an embodiment is described in which the refrigerant mixture is filled into a container in an amount equal to 80 wt % of the maximum filling amount of the refrigerant mixture and in which the proportion of HFC-32 in the liquid phase falls within a range from a target upper-limit composition (x)—3.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 30.0 wt % or 61.5 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 80 wt % of the maximum filling amount, the proportion (initial composition) of HFC-32 in the liquid phase of the refrigerant mixture in the feeding container immediately before the transfer is preferably adjusted to $x+y_{Q3}$ to x wt %, so that the proportion of HFC-32 in the liquid phase of the refrigerant mixture in the feeding container falls within a range from a target upper-limit composition (x) of HFC-32-3.0 wt % (target lower-limit composition) to the target upper-limit composition (x) during initiation and completion of the transfer.

In the above, x is a target upper-limit composition, with the proviso that $10 \leq x \leq 30.0$ or $61.5 \leq x \leq 90$.

$y_{Q3}$ is a lower limit of a gap between the target upper-limit composition and the initial composition, and is represented by Equation (10) below:

$$1000 y_{Q3} = 0.0083 x^3 - 2.54425 x^2 + 180.1067 x - 3371.564 \quad (10)$$

In this embodiment, referring to Equation (10) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—1.8 wt % to x wt %. Changes in the composition in a target container or equipment thereby falls within a range from a target upper-limit composition (x)—3.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—3.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −1.7 wt % of the target upper-limit composition, the proportion of HFC-32 in the liquid phase of the mixture falls within the range from the target upper-limit composition (x)—3.0 wt % (target lower-limit composition) to the target upper-limit composition (x) until the transfer is completed.

(2-5) Filling Method in which the Refrigerant Mixture is Filled into a Container in an Amount Equal to 70 wt % of the Maximum Filling Amount Hereinafter, an embodiment is described in which the refrigerant mixture is filled into a container in an amount equal to 70 wt % of the maximum filling amount of the refrigerant mixture and in which the proportion of HFC-32 in the liquid phase falls within a range from a target upper-limit composition (x)—3.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 32.0 wt % or 56.0 to 90 wt % based on 100 wt % of the total of HFC-32 and HFO-1234ze (E), in transferring the refrigerant mixture in a liquid state to a target container or equipment from a feeding container that is filled with the refrigerant mixture in an amount equal to or less than 70 wt % of the maximum filling amount, the proportion (initial composition) of HFC-32 in the liquid phase of the refrigerant mixture in the feeding container immediately before the transfer is preferably adjusted to $x+y_{Q4}$ to x wt %, so that the proportion of HFC-32 in the liquid phase of the refrigerant mixture in the feeding container falls within a range from a target upper-limit composition (x) of HFC-32-3.0 wt % (target lower-limit composition) to the target upper-limit composition (x) during initiation and completion of the transfer.

In the above, x is a target upper-limit composition, with the proviso that $10 \le x \le 32.0$ or $56.0 \le x \le 90$.

$y_{Q4}$ is a lower limit of a gap between the target upper-limit composition and the initial composition, and is represented by Equation (11) below:

$$1000y_{Q4}=0.0074x^3-2.3485x^2+168.4156x-3324.164 \qquad (11)$$

In this embodiment, referring to Equation (11) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—1.9 wt % to x wt %. Changes in the composition in a target container or equipment thereby falls within a range from a target upper-limit composition (x)—3.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—3.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −1.8 wt % of the target upper-limit composition, the proportion of HFC-32 in the liquid phase of the mixture falls within the range from the target upper-limit composition (x)—3.0 wt % (target lower-limit composition) to the target upper-limit composition (x) until the transfer is completed.

(2-6) Filling Method in which the Refrigerant Mixture is Filled into a Container in an Amount Equal to 60 wt % of the Maximum Filling Amount Hereinafter, an embodiment is described in which the refrigerant mixture is filled into a container in an amount equal to 60 wt % of the maximum filling amount of the refrigerant mixture and in which the proportion of HFC-32 in the liquid phase falls within a range from a target upper-limit composition (x)—3.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 60 wt % of the maximum filling amount, the proportion (initial composition) of HFC-32 in the liquid phase of the refrigerant mixture in the feeding container immediately before the transfer is preferably adjusted to $x+y_{Q5}$ to x wt %, so that the proportion of HFC-32 in the liquid phase of the refrigerant mixture in the feeding container falls within a range from a target upper-limit composition (x) of HFC-32-3.0 wt % (target lower-limit composition) to the target upper-limit composition (x) during initiation and completion of the transfer.

In the above, x is a target upper-limit composition, with the proviso that $10 \le x \le 90$.

$y_{Q5}$ is a lower limit of a gap between the target upper-limit composition and the initial composition, and is represented by Equation (12) below:

$$1000y_{Q5}=0.0070x^3-2.2222x^2+160.0194x-3342.253 \qquad (12)$$

In this embodiment, referring to Equation (12) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—1.9 wt % to x wt %. Changes in the composition in a target container or equipment thereby falls within a range from a target upper-limit composition (x)—3.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—3.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −1.8 wt % of the target upper-limit composition, the proportion of HFC-32 in the liquid phase of the mixture falls within the range from the target upper-limit composition (x)—3.0 wt % (target lower-limit composition) to the target upper-limit composition (x) until the transfer is completed.

(2-7) Method for Filling a Non-Azeotropic Refrigerant Mixture Comprising HFC-32 and HFO-1234ze(E)

Hereinafter, an embodiment of a method for filling a non-azeotropic refrigerant mixture comprising HFC-32 and HFO-1234ze (E) in which a range from a target upper-limit composition (x) of HFC-32-3.0 wt % (target lower-limit composition) to the target upper-limit composition (x) is satisfied.

Equation (7) above may be derived from Equations (8) to (12) above. Based on the value of each coefficient of Equations (8) to (12), $L_2$ to $P_2$ of Equation (7) may be calculated from the target upper-limit composition (x) with respect to the initial filling amount (a wt %).

A method (a gas transfer filling method) of the present invention for filling a refrigerant mixture comprising HFC-32 and HFO-1234ze(E), the HFC-32 being present in a liquid phase in an amount of 10 to 90 wt % based on 100 wt % of the total of HFC-32 and HFO-1234ze(E), has the following feature. Specifically, in transferring the refrigerant mixture in a liquid state into a target container or equipment from a feeding container, the proportion (initial composition) of the HFC-32 in the liquid phase of the refrigerant mixture in the feeding container immediately before the transfer is adjusted to $x+y_2$ (minimum value) to x wt % (maximum value), so that the proportion of the HFC-32 in the liquid phase of the refrigerant mixture in the feeding container falls within a range from a target upper-limit composition (x) of HFC-32-3.0 wt % (target lower-limit composition) to the target upper-limit composition (x) during initiation and completion of the transfer.

In view of the above-described concept of the present invention, when the difference between the target upper-limit composition (x) and the target lower-limit composition is −3.0 wt %, and when a feeding container is filled with the refrigerant mixture in an amount equal to or less than 100 wt % of the maximum filling amount of the refrigerant mixture, if $25.5<x<66.5$, then $y_{Q1}>0$; therefore, x is within a range of 10 to 25.5 wt % or 66.5 to 90 wt %.

When a feeding container is filled with the refrigerant mixture in an amount equal to or less than 90 wt % of the maximum filling amount of the refrigerant mixture, if $27.5<x<64.5$, then $y_{Q2}>0$; therefore, x is within a range of 10 to 27.5 wt % or 64.5 to 90 wt %.

When a feeding container is filled with the refrigerant mixture in an amount equal to or less than 80 wt % of the maximum filling amount of the refrigerant mixture, if $30.0<x<61.5$, then $y_{Q2}>0$; therefore, x is within a range of 10 to 30.0 wt % or 61.5 to 90 wt %.

When a feeding container is filled with the refrigerant mixture in an amount equal to or less than 70 wt % of the maximum filling amount of the refrigerant mixture, if $32.0<x<56.0$, then $y_{Q2}>0$; therefore, x is within a range of 10 to 32.0 wt % or 56.0 to 90 wt %.

a: an amount (wt %) initially filled in the feeding container ($60 \le a \le 100$);

x: a target upper-limit composition (wt %, $10<=x<=90$, excluding a range satisfying the inequality $y_2>0$); and $y_2$: a lower limit of a gap between the target upper-limit composition and the initial composition, $y_2$ being represented by Equation (7) below:

$$1000y_2=L_2x^3-M_2x^2+N_2x-P_2 \quad (7)$$

$L_2=0.0006\ a+0.0033$
$M_2=0.0149\ a+1.3265$
$N_2=0.9005\ a+106.38$
$P_2=0.8193\ a+3287.8$ (3) Filling Method in which the Difference Between the Target Upper-Limit Composition and the Target Lower-Limit Composition is 2 wt %

The mixture ratio is described below in terms of a refrigerant mixture in a feeding container before transfer. This mixture ratio is to achieve, in transferring the refrigerant mixture to a target container or equipment from the feeding container, the proportion of the HFC-32 in the liquid phase of the refrigerant mixture in the feeding container to be within a range from a target upper-limit composition (x) of HFC-32-2.0 wt % (target lower-limit composition) to the target upper-limit composition during initiation and completion of the transfer.

The "target upper-limit composition (x)" is a maximum acceptable value in the range of the composition of HFC-32 required in a target container or equipment in the overall composition (liquid phase and vapor phase) of an HFC-32/HFO-1234ze(E) refrigerant mixture. x (wt. %) is a numerical value within the range of $10 \le x \le 90$. The "target lower-limit composition," i.e., "(x)—2 wt %," is a minimum acceptable value in the range of the composition of HFC-32 required in a target container or equipment in the overall composition (liquid phase and vapor phase) of the HFC-32/HFO-1234ze(E) refrigerant mixture.

(3-1) Filling Method in which the Difference Between the Target Upper-Limit Composition and the Target Lower-Limit Composition is 2 wt %

In one embodiment of the method (a gas transfer filling method) of the present invention for filling a refrigerant mixture comprising HFC-32 and HFO-1234ze(E) in which the HFC-32 is present in the liquid phase in an amount of 10 to 18.0 wt % to 76.0 to 90 wt % based on 100 wt % of the total of the HFC-32 and HFO-1234ze(E), the amount of the refrigerant mixture filled in a container is appropriately adjusted. Such a method has the following feature. Specifically, in transferring the refrigerant mixture in a liquid state into a target container or equipment from a feeding container, the proportion (initial composition) of the HFC-32 in the liquid phase of the refrigerant mixture in the feeding container immediately before the transfer is adjusted to $x+y_3$ (minimum value) to x wt % (maximum value), so that the proportion of the HFC-32 in the liquid phase of the refrigerant mixture in the feeding container falls within a range from a target upper-limit composition (x) of HFC-32-2.0 wt % (target lower-limit composition) to the target upper-limit composition (x) during initiation and completion of the transfer.

a: an amount (wt %) initially filled in the feeding container ($60 \le a \le 100$)

x: a target upper-limit composition (wt %, $10 \le x \le 18.0$ or $76.0 \le x \le 90$, excluding a range satisfying an inequality: $y_3>0$)

$y_3$: a lower limit of a gap between the target upper-limit composition and the initial composition, $y_3$ being represented by Equation (13) below:

$$1000y_3=L_3x^3-M_3x^2+N_3x-P_3 \quad (13)$$

$L_3=0.0006\ a+0.0033$
$M_3=0.0137\ a+1.3646$
$N_3=0.8276\ a+105.68$
$P_3=-0.5186\ a+2205.2$

According to the method for filling a refrigerant mixture of the present invention, the proportion of HFC-32 in the liquid phase of the mixture in a feeding container before transfer is adjusted to a specific range; therefore, even when the feeding container is filled with the refrigerant mixture in an amount equal to 100 wt % of the maximum filling amount, changes in the composition in a target container or equipment fall within a range from a target upper-limit composition (x)—2.0 wt % (target lower-limit composition) to the target upper-limit composition (x) until transfer is completed.

The boiling point of HFC-32 is lower than that of HFO-1234ze(E). Therefore, when the space created due to extraction of refrigerant is refilled with vapor evaporated from the liquid phase during transfer, HFC-32 evaporates in an amount greater than that of HFO-1234yf, causing a reduction in the HFC-32 concentration in the liquid phase. For this reason, HFC-32 is preferably filled into a feeding container before transfer in an amount greater than that of the target composition.

The value a above is usually set to 60≤a≤100.

Hereinafter, one example is described regarding a method that performs transfer at a handling temperature of 40° C. For example, according to the High Pressure Gas Safety Act of Japan, handling a container at a temperature of 40° C. or higher is prohibited; therefore, in particular, in Japan, the handling temperature is 0 to 40° C. when transfer is performed. A higher temperature during transfer (at the time of handling) causes a larger composition change during initiation of the transfer in a liquid state from a feeding container to a target container or equipment and completion of the transfer. Therefore, the conditions for the transfer at a handling temperature of 40° C. is applicable to the conditions for the transfer at a handling temperature ranging from 0 to 40° C.

Moreover, regarding the filling amount in a feeding container, when the refrigerant mixture in a liquid state is transferred to a target container or equipment from the feeding container, a smaller initial filling amount results in a smaller composition change associated with the transfer during initiation and completion of the transfer. Therefore, an equation that satisfies a filling method in which the initial filling amount is a wt % is also satisfied in a filling method in which the initial filling amount is a wt % or less. For example, an equation that satisfies a filling method in which the initial filling amount is 100 wt % is also satisfied in a filling method in which the initial filling amount is 100 to 0 wt %. An equation that satisfies a filling method in which the initial filling amount is 90 wt % is also satisfied in a filling method in which the initial filling amount is 90 to 0 wt %. An equation that satisfies a filling method in which the initial filling amount is 80 wt % is also satisfied in a filling method in which the initial filling amount is 80 to 0 wt %. An equation that satisfies a filling method in which the initial filling amount is 70 wt % is also satisfied in a filling method in which the initial filling amount is 70 to 0 wt %. An equation that satisfies a filling method in which the initial filling amount is 60 wt % is also satisfied in a filling method in which the initial filling amount is 60 to 0 wt %.

Proportion of HFC-32 in the Liquid Phase of the Refrigerant Mixture in a Feeding Container The present invention has a feature in that the proportion (initial composition) of HFC-32 in the liquid phase of the refrigerant mixture in a feeding container immediately before transfer is adjusted to $x+y_3$ (minimum value) to x wt % (target upper-limit composition), so that a range from the target upper-limit composition (x) of HFC-32-2.0 wt % (target lower-limit composition) to the target upper-limit composition (x) is satisfied.

x is a target upper-limit composition; $y_3$ represents a gap between the target upper-limit composition (x) and the initial composition; and $x+y_3$ is a minimum value of the proportion (initial composition) of HFC-32 in the liquid phase of the refrigerant mixture in a feeding container.

The difference between the target upper-limit composition and the target lower-limit composition is referred to as a tolerance (composition tolerance). The tolerance is determined when the composition of a refrigerant mixture is registered in the ASHRAE Standard 2013.

When the mixture ratio of HFC-32 to HFO-1234ze(E) in a refrigerant mixture (HFC-32/HFO-1234ze(E)) comprising HFC-32 and HFO-1234ze(E) is, for example, 50:50 (wt %), and when the tolerance is set to be +1.0, −1.0/+1.0, or −1.0, the target upper-limit composition of HFC-32 is 51.0 wt % while the target lower-limit composition of HFC-32 is 49.0 wt %. Thus, in this refrigerant mixture, the difference between the target upper-limit composition and the target lower-limit composition is 2 wt %.

(3-2) Filling Method in which the Refrigerant Mixture is Filled into a Container in an Amount Equal to 100 wt % of the Maximum Filling Amount Hereinafter, an embodiment is described in which the refrigerant mixture is filled into a container in an amount equal to 100 wt % of the maximum filling amount of the refrigerant mixture and in which the proportion of HFC-32 in the liquid phase falls within a range from a target upper-limit composition (x)—2.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 14.0 wt % or 81.0 to 90 wt % based on 100 wt % of the total of HFC-32 and HFO-1234ze (E), in transferring the refrigerant mixture in a liquid state to a target container or equipment from a feeding container that is filled with the refrigerant mixture in an amount equal to or less than 100 wt % of the maximum filling amount, the proportion (initial composition) of HFC-32 in the liquid phase of the refrigerant mixture in the feeding container immediately before the transfer is preferably adjusted to $x+y_{R1}$ to x wt %, so that the proportion of HFC-32 in the liquid phase of the refrigerant mixture in the feeding container falls within a range from a target upper-limit composition (x) of HFC-32-2.0 wt % (target lower-limit composition) to the target upper-limit composition (x) during initiation and completion of the transfer.

In the above, x is a target upper-limit composition, with the proviso that 10≤x≤14.0 or 81.0≤x≤90.

$y_{R1}$ is a lower limit of a gap between the target upper-limit composition and the initial composition, and is represented by Equation (14) below:

$$1000y_{R1}=0.0088x^3-2.6875x^2+186.3886x-2144.11 \quad (14)$$

In this embodiment, referring to Equation (14) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—0.8 wt % to x wt %. Changes in the composition in a target container or equipment thereby falls within a range from a target upper-limit composition (x)—2.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—2.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −0.7 wt % of the target upper-limit composition, the proportion of HFC-32 in the liquid phase of the mixture falls within the range from the target upper-limit composition (x)—2.0 wt % (target lower-limit composition) to the target upper-limit composition (x) until the transfer is completed.

(3-3) Filling Method in which the Refrigerant Mixture is Filled into a Container in an Amount Equal to 90 wt % of the Maximum Filling Amount Hereinafter, an embodiment is described in which the refrigerant mixture is filled into a container in an amount equal to 90 wt % of the maximum filling amount of the refrigerant mixture and in which the proportion of HFC-32 in the liquid phase falls within a range from a target upper-limit composition (x)—2.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 14.5 wt % or 80.5 to 90 wt % based on 100 wt % of the total of HFC-32 and HFO-1234ze (E), in transferring the refrigerant mixture in a liquid state to a target container or equipment from a feeding container that is filled with the refrigerant mixture in an amount equal to or less than 90 wt % of the maximum filling amount, the proportion (initial composition) of HFC-32 in the liquid phase of the refrigerant mixture in the feeding container immediately before the transfer is preferably adjusted to $x+y_{R2}$ to x wt %, so that the proportion of HFC-32 in the liquid phase of the refrigerant mixture in the feeding container falls within a range from a target upper-limit composition (x) of HFC-32-2.0 wt % (target lower-limit composition) to the target upper-limit composition (x) during initiation and completion of the transfer.

In the above, x is a target upper-limit composition, with the proviso that $10 \leq x \leq 14.5$ or $80.5 \leq x \leq 90$.

$y_{R2}$ is a lower limit of a gap between the target upper-limit composition and the initial composition, and is represented by Equation (15) below:

$$1000y_{R2}=0.0085x^3-2.6087x^2+181.1319x-2166.072 \quad (15)$$

In this embodiment, referring to Equation (15) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—0.9 wt % to x wt %. Changes in the composition in a target container or equipment thereby falls within a range from a target upper-limit composition (x)—2.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—2.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −0.8 wt % of the target upper-limit composition, the proportion of HFC-32 in the liquid phase of the mixture falls within the range from the target upper-limit composition (x)—2.0 wt % (target lower-limit composition) to the target upper-limit composition (x) until the transfer is completed.

(3-4) Filling Method in which the Refrigerant Mixture is Filled into a Container in an Amount Equal to 80 wt % of the Maximum Filling Amount Hereinafter, an embodiment is described in which the refrigerant mixture is filled into a container in an amount equal to 80 wt % of the maximum filling amount of the refrigerant mixture and in which the proportion of HFC-32 in the liquid phase falls within a range from a target upper-limit composition (x)—2.0 wt % (target lower'-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 15.5 wt % or 79.5 to 90 wt % based on 100 wt % of the total of HFC-32 and HFO-1234ze (E), in transferring the refrigerant mixture in a liquid state to a target container or equipment from a feeding container that is filled with the refrigerant mixture in an amount equal to or less than 80 wt % of the maximum filling amount, the proportion (initial composition) of HFC-32 in the liquid phase of the refrigerant mixture in the feeding container immediately before the transfer is preferably adjusted to $x+y_{R3}$ to x wt %, so that the proportion of HFC-32 in the liquid phase of the refrigerant mixture in the feeding container falls within a range from a target upper-limit composition (x) of HFC-32-2.0 wt % (target lower-limit composition) to the target upper-limit composition (x) during initiation and completion of the transfer.

In the above, x is a target upper-limit composition, with the proviso that $10 \leq x \leq 15.5$ or $79.5 \leq x \leq 90$.

$y_{R3}$ is a lower limit of a gap between the target upper-limit composition and the initial composition, and is represented by Equation (16) below:

$$1000y_{R3}=0.0082x^3-2.5108x^2+174.097x-2167.464 \quad (16)$$

In this embodiment, referring to Equation (16) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—0.9 wt % to x wt %. Changes in the composition in a target container or equipment thereby falls within a range from a target upper-limit composition (x)—2.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—2.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −0.8 wt % of the target upper-limit composition, the proportion of HFC-32 in the liquid phase of the mixture falls within the range from the target upper-limit composition (x)—2.0 wt % (target lower-limit composition) to the target upper-limit composition (x) until the transfer is completed.

(3-5) Filling Method in which the Refrigerant Mixture is Filled into a Container in an Amount Equal to 70 wt % of the Maximum Filling Amount Hereinafter, an embodiment is described in which the refrigerant mixture is filled into a container in an amount equal to 70 wt % of the maximum filling amount of the refrigerant mixture and in which the proportion of HFC-32 in the liquid phase falls within a range from a target upper-limit composition (x)—2.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 16.0 wt % or 78.0 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 70 wt % of the maximum filling amount, the proportion (initial composition) of HFC-32 in the liquid phase of the refrigerant mixture in the feeding container immediately before the transfer is preferably adjusted to $x+y_{R4}$ to x wt %, so that the proportion of HFC-32 in the liquid phase of the refrigerant mixture in the feeding container falls within a range from a target upper-limit composition (x) of HFC-32-2.0 wt % (target lower-limit composition) to the target upper-limit composition (x) during initiation and completion of the transfer.

In the above, x is a target upper-limit composition, with the proviso that $10 \leq x \leq 16.0$ or $78.0 \leq x \leq 90$.

$y_{R4}$ is a lower limit of a gap between the target upper-limit composition and the initial composition, and is represented by Equation (17) below:

$$1000y_{R4}=0.0074x^3-2.3367x^2+164.5012x-2176.172 \quad (17)$$

In this embodiment, referring to Equation (17) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—0.9 wt % to x wt %. Changes in the composition in a target container or equipment thereby falls within a range from a target upper-limit composition (x)—2.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—2.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −0.9 wt % of the target upper-limit composition, the proportion of HFC-32 in the liquid phase of the mixture falls within the range from the target upper-limit composition (x)—2.0 wt % (target lower-limit composition) to the target upper-limit composition (x) until the transfer is completed.

(3-6) Filling Method in which the Refrigerant Mixture is Filled into a Container in an Amount Equal to 60 wt % of the Maximum Filling Amount Hereinafter, an embodiment is described in which the refrigerant mixture is filled into a container in an amount equal to 60 wt % of the maximum filling amount of the refrigerant mixture and in which the proportion of HFC-32 in the liquid phase falls within a range from a target upper-limit composition (x)—2.0 wt % (target lower-limit composition) to the target upper-limit composition (x).

In one embodiment of the method of the present invention for filling a refrigerant mixture comprising HFC-32 and HFO-1234ze(E) in which HFC-32 is present in the liquid phase in an amount of 10 to 18.0 wt % or 76.0 to 90 wt % based on 100 wt % of the total of HFC-32 and HFO-1234ze(E), in transferring the refrigerant mixture in a liquid state to a target container or equipment from a feeding container that is filled with the refrigerant mixture in an amount equal to or less than 60 wt % of the maximum filling amount, the proportion (initial composition) of HFC-32 in the liquid phase of the refrigerant mixture in the feeding container immediately before the transfer is preferably adjusted to $x+y_{R5}$ to x wt %, so that the proportion of HFC-32 in the liquid phase of the refrigerant mixture in the feeding container falls within a range from a target upper-limit composition (x) of HFC-32-2.0 wt % (target lower-limit composition) to the target upper-limit composition (x) during initiation and completion of the transfer.

In the above, x is a target upper-limit composition, with the proviso that $10 \leq x \leq 18.0$ or $76.0 \leq x \leq 90$.

$y_{R5}$ is a lower limit of a gap between the target upper-limit composition and the initial composition, and is represented by Equation (18) below:

$$1000 y_{R5} = 0.0065x^3 - 2.1408x^2 + 153.3221x - 2164.988 \quad (18)$$

In this embodiment, referring to Equation (18) above, in transferring the HFC-32/HFO-1234ze(E) refrigerant mixture to a target container or equipment from a feeding container, the proportion of HFC-32 in the liquid phase of the refrigerant mixture in the feeding container before the transfer is adjusted to about x—1.0 wt % to x wt %. Changes in the composition in a target container or equipment thereby falls within a range from a target upper-limit composition (x)—2.0 wt % (target lower-limit composition) to the target upper-limit composition (x) until the transfer is completed.

The boiling point of HFC-32 is lower than that of HFO-1234ze(E). Therefore, when the space created due to extraction of refrigerant is refilled with vapor evaporated from the liquid phase during the transfer, HFC-32 evaporates in an amount greater than that of HFO-1234ze(E), causing a reduction in the HFC-32 concentration in the liquid phase. For this reason, HFC-32 is preferably filled into a feeding container before the transfer in an amount greater than that of the target composition. In the method for filling a refrigerant mixture in which changes in the composition of the HFC-32/HFO-1234ze(E) refrigerant mixture is made to fall within a range from a target upper-limit composition (x)—2.0 wt % (target lower-limit composition) to the target upper-limit composition (x) in a target container or equipment until the transfer is completed, the upper limit of the proportion of HFC-32 in the liquid phase of the HFC-32/HFO-1234ze(E) refrigerant mixture is equal to the target upper-limit composition of HFC-32.

Further, when the mixture contains HFC-32 in an amount of 90 wt %, changes in the composition of HFC-32 are small; therefore, even when the initial composition of HFC-32 is about −0.9 wt % of the target upper-limit composition, the proportion of HFC-32 in the liquid phase of the mixture falls within the range from the target upper-limit composition (x)—2.0 wt % (target lower-limit composition) to the target upper-limit composition (x) until the transfer is completed.

(3-7) Method for Filling a Non-Azeotropic Refrigerant Mixture Comprising HFC-32 and HFO-1234ze(E)

Hereinafter, an embodiment of a method for filling a non-azeotropic refrigerant mixture comprising HFC-32 and HFO-1234ze (E) in which a range from a target upper-limit composition (x) of HFC-32-2.0 wt % (target lower-limit composition) to the target upper-limit composition (x) is satisfied.

Equation (13) above may be derived from Equations (14) to (18) above. Based on the value of each coefficient of Equations (14) to (18), $L_3$ to $P_3$ of Equation (13) may be calculated from the target upper-limit composition (x) with respect to the initial filling amount (a wt %).

A method (a gas transfer filling method) of the present invention for filling a refrigerant mixture comprising HFC-32 and HFO-1234ze(E), the HFC-32 being present in a liquid phase in an amount of 10 to 18 wt % to 76 to 90 wt % based on 100 wt % of the total of HFC-32 and HFO-1234ze(E), has the following feature. Specifically, in transferring the refrigerant mixture in a liquid state into a target container or equipment from a feeding container, the proportion (initial composition) of the HFC-32 in the liquid phase of the refrigerant mixture in the feeding container immediately before the transfer is adjusted to $x+y_3$ (minimum value) to x wt % (maximum value), so that the proportion of the HFC-32 in the liquid phase of the refrigerant mixture in the feeding container falls within a range from a target upper-limit composition (x) of HFC-32-2.0 wt % (target lower-limit composition) to the target upper-limit composition (x) during initiation and completion of the transfer.

In view of the above-described concept of the present invention, when the difference between the target upper-limit composition (x) and the target lower-limit composition is −2.0 wt %, and when a feeding container is filled with the refrigerant mixture in an amount equal to or less than 100 wt % of the maximum filling amount, if $14.0 < x < 81.0$, then $y_{R1} > 0$; therefore, x is within a range of 10.0 to 14.0 wt % or 81.0 to 90.0 wt %.

When a feeding container is filled with the refrigerant mixture in an amount equal to or less than 90 wt % of the maximum filling amount of the refrigerant mixture, if $14.5 < x < 80.5$, then $y_{R2} > 0$; therefore, x is within a range of 10 to 14.5 wt % or 80.5 to 90 wt %.

When a feeding container is filled with the refrigerant mixture in an amount equal to or less than 80 wt % of the maximum filling amount of the refrigerant mixture, if $15.5 < x < 79.5$, then $y_{R3} > 0$; therefore, x is within a range of 10 to 15.5 wt % or 79.5 to 90 wt %.

When a feeding container is filled with the refrigerant mixture in an amount equal to or less than 70 wt % of the maximum filling amount of the refrigerant mixture, if $16.0 < x < 78.0$, then $y_{R4} > 0$; therefore, x is within a range of 10 to 16.0 wt % or 78.0 to 90 wt %.

When a feeding container is filled with the refrigerant mixture in an amount equal to or less than 60 wt % of the maximum filling amount of the refrigerant mixture, if $18.0 < x < 76.0$, then $y_{R5} > 0$; therefore, x is within a range of 10 to 18.0 wt % or 76.0 to 90 wt %.

a: an amount (wt %) initially filled in the feeding container ($60 \leq a \leq 100$);

x: a target upper-limit composition (wt %, $10 \leq x \leq 18.0$ wt % or $76.0 \leq x \leq 90$, excluding a range satisfying an inequality: $y_3 > 0$); and $y_3$: a lower limit of a gap between the target upper-limit composition and the initial composition, $y_3$ being represented by Equation (13) below:

$$1000 y_3 = L_3 x^3 - M_3 x^2 + N_3 x - P_3 \quad (13)$$

$L_3 = 0.0006$ a+0.0033
$M_3 = 0.0137$ a+1.3646
$N_{3=0.8276}$ a+105.68
$P_3 = -0.5186$ a+2205.2

(4) Addition of Third Component

Among HFC-32/HFO-1234ze(E) refrigerant mixtures, the target of the present invention is, in particular, a mixed composition comprising HFC-32 in an amount of 10 to 90 wt %. However, as long as the behavior of the HFC-32/HFO-1234ze(E) refrigerant mixture in terms of the composition change is not greatly impaired, the HFC-32/HFO-1234ze(E) refrigerant mixture may further comprise one or more non-azeotropic compounds to improve the properties of the HFC-32/HFO-1234ze(E) refrigerant mixture, for example, to improve compatibility with a refrigerating machine oil, to suppress flammability, to reduce GWP, or to improve refrigerating capacity. The amount of the composition or compositions added is preferably about 1 to 10 wt %. Examples of non-azeotropic compounds include, but are not particularly limited to, HFCs such as HFC-125, HFC-152a, and HFC-143a; HFOs such as HFO-1234yf, HFO-1243zf, and HFO-1225ye; isobutane; butane; propane; $CO_2$; and the like. These compounds may be used alone, or in a combination of two or more.

The feeding container of the present invention is not particularly limited insofar as it is a hermetically sealed container that can store a refrigerant mixture. Examples thereof include a tank, a tanker, a storage tank, and the like. The composition of the mixture is likely to undergo a change when a feeding container has a small capacity, and when a large amount of a mixture is extracted at a time.

In this method, as long as the amount initially filled into a feeding container is 60 to 100 wt % of the maximum filling amount, transfer can be performed several times in divided portions until it is completed. This method plays a role even when the transfer is stopped before the liquid phase is entirely transferred.

The equipment to which a refrigerant mixture is transferred may be any device as long as it uses a vapor compression refrigeration cycle. Such a device is not particularly limited, and may be, for example, a refrigeration air-conditioning system, a refrigerator, or a hot-water supplier.

Vapor compression refrigeration equipment produced by the method of the present invention comprises refrigerant and the main body of the refrigeration equipment. The main body of the refrigeration equipment is not particularly limited, and a known body of refrigeration equipment may be used as is.

To perform the transfer, known means may be used. For example, the transfer may be performed by using a pressure difference, a pump, or the like.

Further, for example, according to the High Pressure Gas Safety Act of Japan, handling a container at a temperature of 40° C. or higher is prohibited; therefore, the handling temperature is basically 0 to 40° C. when transfer is performed. Also in international law, etc., it is required to avoid handling high-pressure gas at a high temperature. A higher temperature during transfer (at the time of handling) causes a larger composition change associated with the transfer. Therefore, the conditions for the transfer at a handling temperature of 40° C. can also be applied to the conditions for the transfer at a handling temperature ranging from 0 to 40° C.

Advantageous Effects of Invention

When a non-azeotropic refrigerant mixture comprising HFO-1234ze(E) and HFC-32 is filled by the method of the present invention, composition changes associated with the transfer of the refrigerant mixture fall within an acceptable range.

DESCRIPTION OF EMBODIMENTS

The present invention is described with reference to Examples; however, the present invention is not limited thereto, without departing from the scope of the invention.

(1) Reference Example 1

A 10-L hermetically sealed container was filled with trans-1,3,3,3-tetrafluoropropene (HFO-1234ze(E)) and difluoromethane (HFC-32) in the maximum amount that could be filled with the composition immediately before transfer so that the liquid phase had a fixed composition at 40° C., and the container was maintained at 40° C. The maximum filling amount is defined by law and calculated as below:

$$G = V/C$$

G: Mass of fluorocarbon (kg)
V: Capacity (L) of the container
C: Constant according to the type of fluorocarbon The fill constant C here is determined in Japan as a value obtained by dividing 1.05 by the specific gravity of the gas at 48° C.

When export is involved, according to international law, the fill constant C is defined as a value obtained by dividing 1.05 by the specific gravity of the gas at 65° C. when passing through tropical regions, and it is defined as a value obtained by dividing 1.05 by the specific gravity of the gas at 45° C. when only regions other than tropical regions are involved.

In Reference Example 1, a value obtained by dividing 1.05 by the specific gravity of the gas at 45° C. or 65° C. was used as the fill constant.

The reasons for selecting 40° C. as the temperature during the transfer are that the use of containers at a temperature over 40° C. is prohibited by the High Pressure Gas Safety Act of Japan, that international law, etc., also require avoiding the use of containers at a high temperature, and that since a larger composition change develops at a higher temperature, data obtained at a temperature of 40° C. is assumed to be data from the severest conditions.

Subsequently, the liquid phase was gradually transferred from the container to another empty container using a pump. Part of the gas was collected through a sampling valve disposed in the middle of a pipe for extracting the liquid phase, and the component composition was analyzed by gas chromatography.

Table 1 shows the results of composition changes during the transfer in Reference Example 1 when the filling amount is calculated by using, as the fill constant, values obtained by dividing 1.05 by the specific gravity of the gas at 45° C.

TABLE 1

| Filling amount wt % | HFC-32 target composition wt % | Gap (a) between target upper-limit composition and lower-limit composition wt % | HFC-32 target upper-limit composition (x) wt % | HFC-32 target lower-limit composition (x − a) wt % | HFC-32 composition before transfer wt % | HFC-32 composition after extraction of liquid wt % | Gap from HFC-32 target upper-limit composition wt % | Composition after extraction of liquid ≥ target lower-limit composition ≥: ○ ≤: X |
|---|---|---|---|---|---|---|---|---|
| 100 | 70.0 | 4 | 72.0 | 68.0 | 72.0 | 69.3 | −2.7 | ○ |
| 100 | 70.0 | 4 | 72.0 | 68.0 | 71.0 | 68.3 | −3.7 | ○ |
| 100 | 70.0 | 4 | 72.0 | 68.0 | 70.0 | 67.2 | −4.8 | X |

TABLE 1-continued

| Filling amount wt % | HFC-32 target composition wt % | Gap (a) between target upper-limit composition and lower-limit composition wt % | HFC-32 target upper-limit composition (x) wt % | HFC-32 target lower-limit composition (x − a) wt % | HFC-32 composition before transfer wt % | HFC-32 composition after extraction of liquid wt % | Gap from HFC-32 target upper-limit composition wt % | Composition after extraction of liquid ≥ target lower-limit composition ≥: ○ ≤: X |
|---|---|---|---|---|---|---|---|---|
| 100 | 40.0 | 4 | 42.0 | 38.0 | 42.0 | 38.4 | −3.6 | ○ |
| 100 | 40.0 | 4 | 42.0 | 38.0 | 41.0 | 37.4 | −4.6 | X |
| 100 | 40.0 | 4 | 43.0 | 39.0 | 41.0 | 37.4 | −5.6 | X |
| 100 | 40.0 | 4 | 41.0 | 37.0 | 41.0 | 37.4 | −3.6 | ○ |
| 100 | 80.0 | 3 | 81.5 | 78.5 | 82.0 | 80.1 | −1.4 | ○ |
| 100 | 80.0 | 3 | 81.5 | 78.5 | 81.0 | 79.0 | −2.5 | ○ |
| 100 | 80.0 | 3 | 81.5 | 78.5 | 80.0 | 77.9 | −3.6 | X |
| 100 | 70.0 | 3 | 71.5 | 68.5 | 71.5 | 68.8 | −2.7 | ○ |
| 100 | 70.0 | 3 | 71.5 | 68.5 | 70.0 | 67.2 | −4.3 | X |
| 100 | 40.0 | 3 | 41.5 | 38.5 | 41.5 | 37.9 | −3.6 | X |
| 100 | 40.0 | 3 | 42.0 | 39.0 | 42.0 | 38.4 | −3.6 | X |
| 100 | 80.0 | 2 | 81.0 | 79.0 | 81.0 | 79.0 | −2.0 | ○ |
| 100 | 80.0 | 2 | 81.0 | 79.0 | 80.0 | 77.9 | −3.1 | X |
| 100 | 50.0 | 2 | 51.0 | 49.0 | 51.0 | 47.5 | −3.5 | X |
| 100 | 12.0 | 2 | 13.0 | 11.0 | 13.0 | 11.1 | −1.9 | ○ |
| 100 | 12.0 | 2 | 13.0 | 11.0 | 12.5 | 10.7 | −2.3 | X |
| 60 | 70.0 | 4 | 72.0 | 68.0 | 72.0 | 69.76 | −2.2 | ○ |
| 60 | 70.0 | 4 | 72.0 | 68.0 | 71.0 | 68.71 | −3.3 | ○ |
| 60 | 70.0 | 4 | 72.0 | 68.0 | 70.0 | 67.66 | −4.3 | X |
| 60 | 40.0 | 4 | 42.0 | 38.0 | 42.0 | 39.04 | −3.0 | ○ |
| 60 | 40.0 | 4 | 42.0 | 38.0 | 41.0 | 38.05 | −3.9 | ○ |
| 60 | 40.0 | 4 | 42.0 | 38.0 | 40.0 | 37.07 | −4.9 | X |
| 60 | 40.0 | 4 | 43.0 | 39.0 | 41.0 | 38.05 | −4.9 | X |
| 60 | 40.0 | 4 | 41.0 | 37.0 | 41.0 | 38.05 | −2.9 | ○ |
| 60 | 80.0 | 3 | 81.5 | 78.5 | 82.0 | 80.40 | −1.1 | ○ |
| 60 | 80.0 | 3 | 81.5 | 78.5 | 81.0 | 79.34 | −2.2 | ○ |
| 60 | 80.0 | 3 | 81.5 | 78.5 | 80.0 | 78.27 | −3.2 | X |
| 60 | 70.0 | 3 | 71.5 | 68.5 | 71.5 | 69.23 | −2.3 | ○ |
| 60 | 70.0 | 3 | 71.5 | 68.5 | 70.0 | 67.66 | −3.8 | X |
| 60 | 40.0 | 3 | 41.5 | 38.5 | 41.5 | 38.55 | −3.0 | ○ |
| 60 | 40.0 | 3 | 42.0 | 39.0 | 42.0 | 39.04 | −3.0 | ○ |
| 60 | 80.0 | 2 | 81.0 | 79.0 | 81.0 | 79.34 | −1.7 | ○ |
| 60 | 80.0 | 2 | 81.0 | 79.0 | 80.0 | 78.27 | −2.7 | X |
| 60 | 50.0 | 2 | 51.0 | 49.0 | 51.0 | 48.05 | −2.9 | X |
| 60 | 12.0 | 2 | 13.0 | 11.0 | 13.0 | 11.48 | −1.5 | ○ |
| 60 | 12.0 | 2 | 13.0 | 11.0 | 12.5 | 11.03 | −2.0 | ○ |

Table 1 reveals that the concentration of HFC-32 in the HFC-32/HFO-1234ze(E) refrigerant mixture at the time of the completion of the transfer was lower than that at the time of the start of the transfer. This is because the boiling point of HFC-32 is lower than the boiling point of HFO-1234ze (E), and when the space created due to extraction of the refrigerant is refilled with vapor evaporated from the liquid phase during the transfer, HFC-32 evaporates in an amount greater than that of HFO-1234ze(E), causing a reduction in the HFC-32 concentration in the liquid phase. It was thus found that HFC-32 was preferably filled into a feeding container before the transfer in an amount greater than that of the target composition.

Table 1 shows that when a certain target composition is determined, and the width of the upper and lower compositions including the target composition is set in the range of 2 to 4, if the transfer is started, without taking any measure, while setting a certain composition within the composition width as the initial composition, the composition at the time of the completion of the transfer (at the time of extraction of the liquid) may be equal to or lower than the target lower-limit composition. Thus, refrigeration capacity and refrigerant capacity (e.g., COP) expected from the target composition cannot be ensured during start and completion of the transfer.

Accordingly, when a certain target composition, and a target upper-limit composition and a lower-limit composition including the target composition were set, in what composition range the initial composition should be set in order to enable all of the compositions during start and completion of the transfer to fall within the range from the target lower-limit composition to the upper-limit composition was clarified.

(2) Filling Method when the Gap Between the Target Upper-Limit Composition and the Target Lower-Limit Composition is 4 wt %

(2-1) Example 1

Initial Filling Amount in the Feeding Container: 100 wt % of the Maximum Filling Amount A 10-L hermetically sealed container was filled with HFO-1234ze(E) and HFC-32 in the maximum amount (100 wt % of the maximum filling amount) that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Reference Example 1, the liquid phase was gradually transferred from the container to another empty container by using a pump, and the component composition was analyzed. Table 2 shows the results of composition changes during the transfer when the initial composition was adjusted to the target upper-limit composition.

TABLE 2

| HFC-32 target upper-limit composition (x) wt % | HFC-32 composition before transfer wt % | HFC-32 composition after extraction of liquid wt % | Gap from HFC-32 target upper-limit composition wt % |
| --- | --- | --- | --- |
| 90.0 | 90.0 | 88.9 | −1.1 |
| 80.0 | 80.0 | 77.9 | −2.1 |
| 70.0 | 70.0 | 67.2 | −2.8 |
| 60.0 | 60.0 | 56.7 | −3.3 |
| 50.0 | 50.0 | 46.5 | −3.5 |
| 40.0 | 40.0 | 36.5 | −3.5 |
| 30.0 | 30.0 | 26.8 | −3.2 |
| 20.0 | 20.0 | 17.4 | −2.6 |
| 10.0 | 10.0 | 8.5 | −1.5 |

As shown in Table 2, by adjusting the initial composition before transfer to the target upper-limit composition, the proportion of HFC-32 in the liquid phase falls within the range from the target upper-limit composition-4.0 wt % (target lower-limit composition) to the target upper-limit composition when the HFC-32 composition, among the compositions from the start of filling (before the transfer) until the entire liquid is extracted (until the transfer is completed), is within a range of 10 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 3 shows the lower limit ($y_{P1}$) of the gap between the target upper-limit composition and the initial composition in this case.

TABLE 3

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
| --- | --- | --- | --- |
| 90.0 | 87.5 | 86.1 | −2.5 |
| 82.0 | 80.1 | 78.0 | −1.9 |
| 72.0 | 70.8 | 68.1 | −1.2 |
| 62.0 | 61.3 | 58.1 | −0.7 |
| 52.0 | 51.6 | 48.1 | −0.4 |
| 42.0 | 41.6 | 38.0 | −0.4 |
| 32.0 | 31.3 | 28.0 | −0.7 |
| 22.0 | 20.7 | 18.1 | −1.3 |
| 12.0 | 9.5 | 8.1 | −2.5 |

The results show that HFC-32 undergoes the least composition change when the target composition is 90 wt %, and that even when the initial composition of HFC-32 in the HFC-32/HFO-1234ze(E) refrigerant mixture in the liquid phase is −2.5 wt % of the target composition, the proportion of HFC-32 in the liquid phase falls within the range from the target upper-limit composition-4.0 wt % (target lower-limit composition) to the target upper-limit composition from before the transfer to the completion of the transfer.

Based on these results, the lower limit ($y_n$) of the gap between the target upper-limit composition and the initial composition is represented by the following equation using the target composition (x):

$$1000 y_{P1} = 0.009x^3 - 2.8565x^2 + 202.202x - 4579.154 \quad (2)$$

Based on Table 1, where the target composition should be set between the target lower-limit to upper-limit compositions was raised. By setting the lower limit ($y_{P1}$) based on Table 3, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{P1}$ to the target upper-limit composition, the proportion of HFC-32 in the liquid phase falls within the range from the target upper-limit composition-4.0 wt % (target lower-limit composition) to the target upper-limit composition from before the transfer to the completion of the transfer.

(2-2) Example 2

Initial Filling Amount in the Feeding Container: 90 wt % of the Maximum Filling Amount A 10-L hermetically sealed container was filled with HFO-1234ze(E) and HFC-32 in 90 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 1, the liquid phase was gradually transferred from the container to another empty container by using a pump, and the component composition was analyzed. Table 4 shows the results of composition changes during the transfer when the initial composition was adjusted to the target upper-limit composition.

TABLE 4

| HFC-32 target upper-limit composition (x) wt % | HFC-32 composition before transfer wt % | HFC-32 composition after extraction of liquid wt % | Gap from HFC-32 target upper-limit composition wt % |
| --- | --- | --- | --- |
| 90.0 | 90.0 | 88.9 | −1.1 |
| 80.0 | 80.0 | 78.0 | −2.0 |
| 70.0 | 70.0 | 67.3 | −2.7 |
| 60.0 | 60.0 | 56.8 | −3.2 |
| 50.0 | 50.0 | 46.6 | −3.4 |
| 40.0 | 40.0 | 36.6 | −3.4 |
| 30.0 | 30.0 | 26.9 | −3.1 |
| 20.0 | 20.0 | 17.5 | −2.5 |
| 10.0 | 10.0 | 8.6 | −1.4 |

As shown in Table 4, by adjusting the initial composition before transfer to the target upper-limit composition, the proportion of HFC-32 in the liquid phase falls within the range from the target upper-limit composition-4.0 wt % (target lower-limit composition) to the target upper-limit composition when the HFC-32 composition, among the compositions from the start of filling (before the transfer) until the entire liquid is extracted (until the transfer is completed), is within a range of 10 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 5 shows the lower limit ($y_{P2}$) of the gap between the target upper-limit composition and the initial composition in this case.

TABLE 5

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
| --- | --- | --- | --- |
| 90.0 | 87.4 | 86.0 | −2.6 |
| 82.0 | 80.1 | 78.1 | −1.9 |
| 72.0 | 70.7 | 68.1 | −1.3 |
| 62.0 | 61.2 | 58.1 | −0.8 |
| 52.0 | 51.4 | 48.0 | −0.6 |
| 42.0 | 41.5 | 38.1 | −0.5 |
| 32.0 | 31.2 | 28.0 | −0.8 |
| 22.0 | 20.6 | 18.1 | −1.4 |
| 12.0 | 9.4 | 8.0 | −2.6 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −2.6 wt % of the target upper-limit composition, the proportion of HFC-32 in the liquid phase falls within the range from the target upper-limit composition-4.0 wt % (target lower-limit composition) to the target upper-limit composition from before the transfer to the completion of the transfer.

Based on these results, the lower limit ($y_{P2}$) of the gap between the target upper-limit composition and the initial composition is represented by the following equation using the target upper-limit composition (x):

$$1000 y_{P2} = 0.0089 x^3 - 2.714 x^2 + 194.2292 x - 4574.474 \qquad (3)$$

By setting the lower limit ($y_{P2}$) based on Table 5, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{P2}$ to the target upper-limit composition, the proportion of HFC-32 in the liquid phase falls within the range from the target upper-limit composition-4.0 wt % (target lower-limit composition) to the target upper-limit composition from before the transfer to the completion of the transfer.

(2-3) Example 3

Initial Filling Amount in the Feeding Container: 80 wt % of the Maximum Filling Amount A 10-L hermetically sealed container was filled with HFO-1234ze(E) and HFC-32 in 80 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 1, the liquid phase was gradually transferred from the container to another empty container by using a pump, and the component composition was analyzed. Table 6 shows the results of composition changes during the transfer when the initial composition was adjusted to the target upper-limit composition.

TABLE 6

| HFC-32 target upper-limit composition (x) wt % | HFC-32 composition before transfer wt % | HFC-32 composition after extraction of liquid wt % | Gap from HFC-32 target upper-limit composition wt % |
| --- | --- | --- | --- |
| 90.0 | 90.0 | 88.9 | −1.1 |
| 80.0 | 80.0 | 78.1 | −1.9 |
| 70.0 | 70.0 | 67.4 | −2.6 |
| 60.0 | 60.0 | 57.0 | −3.0 |
| 50.0 | 50.0 | 46.7 | −3.3 |
| 40.0 | 40.0 | 36.7 | −3.3 |
| 30.0 | 30.0 | 27.0 | −3.0 |
| 20.0 | 20.0 | 17.6 | −2.4 |
| 10.0 | 10.0 | 8.6 | −1.4 |

As shown in Table 6, by adjusting the initial composition before transfer to the target upper-limit composition, the proportion of HFC-32 in the liquid phase falls within the range from the target upper-limit composition-4.0 wt % (target lower-limit composition) to the target upper-limit composition when the HFC-32 composition, among the compositions from the start of filling (before the transfer) until the entire liquid is extracted (until the transfer is completed), is within a range of 10 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 7 shows the lower limit ($y_{p3}$) of the gap between the target upper-limit composition and the initial composition in this case.

TABLE 7

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
| --- | --- | --- | --- |
| 90.0 | 87.4 | 86.1 | −2.6 |
| 82.0 | 80.0 | 78.1 | −2.0 |
| 72.0 | 70.6 | 68.0 | −1.4 |
| 62.0 | 61.0 | 58.0 | −1.0 |
| 52.0 | 51.3 | 48.0 | −0.7 |
| 42.0 | 41.3 | 38.0 | −0.7 |
| 32.0 | 31.1 | 28.1 | −0.9 |
| 22.0 | 20.4 | 18.0 | −1.6 |
| 12.0 | 9.3 | 8.0 | −2.7 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −2.6 wt % of the target upper-limit composition, the proportion of HFC-32 in the liquid phase falls within the range from the target upper-limit composition-4.0 wt % (target lower-limit composition) to the target upper-limit composition from before the transfer to the completion of the transfer.

Based on these results, the lower limit ($y_{P3}$) of the gap between the target upper-limit composition and the initial composition is represented by the following equation using the target upper-limit composition (x):

$$1000y_{P3}=0.0084x^3-2.5913x^2+185.8744x-4552.951 \quad (4)$$

By setting the lower limit ($y_{P3}$) based on Table 7, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{P3}$ to the target upper-limit composition, the proportion of HFC-32 in the liquid phase falls within the range from the target upper-limit composition-4.0 wt % (target lower-limit composition) to the target upper-limit composition from before the transfer to the completion of the transfer.

(2-4) Example 4

Initial Filling Amount in the Feeding Container: 70 wt % of the Maximum Filling Amount A 10-L hermetically sealed container was filled with HFO-1234ze(E) and HFC-32 in 70 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 1, the liquid phase was gradually transferred from the container to another empty container by using a pump, and the component composition was analyzed. Table 8 shows the results of composition changes during the transfer when the initial composition was adjusted to the target upper-limit composition.

TABLE 8

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 89.0 | −1.0 |
| 80.0 | 80.0 | 78.2 | −1.8 |
| 70.0 | 70.0 | 67.5 | −2.5 |
| 60.0 | 60.0 | 57.1 | −2.9 |
| 50.0 | 50.0 | 46.9 | −3.1 |
| 40.0 | 40.0 | 36.9 | −3.1 |
| 30.0 | 30.0 | 27.2 | −2.8 |
| 20.0 | 20.0 | 17.8 | −2.2 |
| 10.0 | 10.0 | 8.7 | −1.3 |

As shown in Table 8, by adjusting the initial composition before transfer to the target upper-limit composition, the proportion of HFC-32 in the liquid phase falls within the range from the target upper-limit composition-4.0 wt % (target lower-limit composition) to the target upper-limit composition when the HFC-32 composition, among the compositions from the start of filling (before the transfer) until the entire liquid is extracted (until the transfer is completed), is within a range of 10 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 9 shows the lower limit ($y_{P4}$) of the gap between the target upper-limit composition and the initial composition in this case.

TABLE 9

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
|---|---|---|---|
| 90.0 | 87.3 | 86.0 | −2.7 |
| 82.0 | 79.9 | 78.1 | −2.1 |
| 72.0 | 70.5 | 68.1 | −1.5 |
| 62.0 | 60.9 | 58.0 | −1.1 |
| 52.0 | 51.1 | 48.0 | −0.9 |
| 42.0 | 41.2 | 38.1 | −0.8 |
| 32.0 | 30.9 | 28.0 | −1.1 |
| 22.0 | 20.3 | 18.0 | −1.7 |
| 12.0 | 9.3 | 8.1 | −2.7 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −2.7 wt % of the target upper-limit composition, the proportion of HFC-32 in the liquid phase falls within the range from the target upper-limit composition-4.0 wt % (target lower-limit composition) to the target upper-limit composition from before the transfer to the completion of the transfer.

Based on these results, the lower limit ($y_{P4}$) of the gap between the target upper-limit composition and the initial composition is represented by the following equation using the target upper-limit composition (x):

$$1000y_{P4}=0.0075x^3-2.3976x^2+174.6504x-4526.37 \quad (5)$$

By setting the lower limit ($y_{P4}$) based on Table 9, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{P4}$ to the target upper-limit composition, the proportion of HFC-32 in the liquid phase falls within the range from the target upper-limit composition-4.0 wt % (target lower-limit composition) to the target upper-limit composition from before the transfer to the completion of the transfer.

(2-5) Example 5

Initial Filling Amount in the Feeding Container: 60 wt % of the Maximum Filling Amount A 10-L hermetically sealed container was filled with HFO-1234ze(E) and HFC-32 in 60 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 1, the liquid phase was gradually transferred from the container to another empty container by using a pump, and the component composition was analyzed. Table 10 shows the results of composition changes during the transfer when the initial composition was adjusted to the target upper-limit composition.

TABLE 10

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 89.0 | −1.0 |
| 80.0 | 80.0 | 78.3 | −1.7 |
| 70.0 | 70.0 | 67.7 | −2.3 |
| 60.0 | 60.0 | 57.3 | −2.7 |
| 50.0 | 50.0 | 47.0 | −3.0 |
| 40.0 | 40.0 | 37.1 | −2.9 |
| 30.0 | 30.0 | 27.3 | −2.7 |
| 20.0 | 20.0 | 17.9 | −2.1 |
| 10.0 | 10.0 | 8.8 | −1.2 |

As shown in Table 10, by adjusting the initial composition before transfer to the target upper-limit composition, the proportion of HFC-32 in the liquid phase falls within the range from the target upper-limit composition-4.0 wt % (target lower-limit composition) to the target upper-limit composition when the HFC-32 composition, among the compositions from the start of filling (before the transfer) until the entire liquid is extracted (until the transfer is completed), is within a range of 10 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 11 shows the lower limit ($y_{P5}$) of the gap between the target upper-limit composition and the initial composition in this case.

TABLE 11

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
|---|---|---|---|
| 90.0 | 87.2 | 86.0 | −2.8 |
| 82.0 | 79.8 | 78.1 | −2.2 |
| 72.0 | 70.4 | 68.1 | −1.6 |
| 62.0 | 60.8 | 58.1 | −1.2 |
| 52.0 | 51.0 | 48.1 | −1.0 |
| 42.0 | 41.0 | 38.1 | −1.0 |
| 32.0 | 30.8 | 28.1 | −1.2 |
| 22.0 | 20.2 | 18.1 | −1.8 |
| 12.0 | 9.2 | 8.1 | −2.8 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −2.8 wt % of the target upper-limit composition, the proportion of HFC-32 in the liquid phase falls within the range from the target upper-limit composition-4.0 wt % (target lower-limit composition) to the target upper-limit composition from before the transfer to the completion of the transfer.

Based on these results, the lower limit ($y_{P5}$) of the gap between the target upper-limit composition and the initial composition is represented by the following equation using the target upper-limit composition (x):

$$1000 y_{P5} = 0.0071 x^3 - 2.2789 x^2 + 166.8604 x - 4545.862 \quad (6)$$

By setting the lower limit ($y_{P5}$) based on Table 11, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{P5}$ to the target upper-limit composition, the proportion of HFC-32 in the liquid phase falls within the range from the target upper-limit composition-4.0 wt % (target lower-limit composition) to the target upper-limit composition from before the transfer to the completion of the transfer.

(3) Filling Method when the Gap Between the Target Upper-Limit Composition and the Target Lower-Limit Composition is 3 wt %

(3-1) Example 6

Initial Filling Amount in the Feeding Container: 100 wt % of the Maximum Filling Amount A 10-L hermetically sealed container was filled with HFO-1234ze(E) and HFC-32 in the maximum filling amount (100 wt % of the maximum filling amount) that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Reference Example 1, the liquid phase was gradually transferred from the container to another empty container by using a pump, and the component composition was analyzed. Table 12 shows the results of composition changes during the transfer when the initial composition was adjusted to the target upper-limit composition.

TABLE 12

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 88.9 | −1.1 |
| 80.0 | 80.0 | 77.9 | −2.1 |
| 70.0 | 70.0 | 67.2 | −2.8 |
| 66.5 | 66.5 | 63.5 | −3.0 |
| 25.5 | 25.5 | 22.5 | −3.0 |
| 20.0 | 20.0 | 17.4 | −2.6 |
| 10.0 | 10.0 | 8.5 | −1.5 |

As shown in Table 12, by adjusting the initial composition before transfer to the target upper-limit composition, the proportion of HFC-32 in the liquid phase falls within the range from the target upper-limit composition-3.0 wt % (target lower-limit composition) to the target upper-limit composition when the HFC-32 composition, among the compositions from the start of filling (before the transfer)

until the entire liquid is extracted (until the transfer is completed), is within a range of 10 to 25.5 wt % or 66.5 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 13 shows the lower limit ($y_{Q1}$) of the gap between the target upper-limit composition and the initial composition in this case.

TABLE 13

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
| --- | --- | --- | --- |
| 90.0 | 88.4 | 87.1 | −1.6 |
| 81.5 | 80.6 | 78.6 | −0.9 |
| 71.5 | 71.3 | 68.6 | −0.2 |
| 66.5 | 66.5 | 63.5 | 0.0 |
| 25.5 | 25.5 | 22.5 | 0.0 |
| 21.5 | 21.2 | 18.5 | −0.3 |
| 11.5 | 10.0 | 8.5 | −1.5 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −1.6 wt % of the target upper-limit composition, the proportion of HFC-32 in the liquid phase falls within the range from the target upper-limit composition-3.0 wt % (target lower-limit composition) to the target upper-limit composition from before the transfer to the completion of the transfer.

Based on these results, the lower limit ($y_{Q1}$) of the gap between the target upper-limit composition and the initial composition is represented by the following equation using the target upper-limit composition (x):

$$1000 y_{Q1} = 0.0093 x^3 - 2.79655 x^2 + 194.9369 x - 3361.644 \quad (8)$$

By setting the lower limit ($y_{Q1}$) based on Table 13, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{Q1}$ to the target upper-limit composition, the proportion of HFC-32 in the liquid phase falls within the range from the target upper-limit composition-3.0 wt % (target lower-limit composition) to the target upper-limit composition from before the transfer to the completion of the transfer.

(3-2) Example 7

Initial Filling Amount in the Feeding Container: 90 wt % of the Maximum Filling Amount A 10-L hermetically sealed container was filled with HFO-1234ze(E) and HFC-32 in 90 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 6, the liquid phase was gradually transferred from the container to another empty container by using a pump, and the component composition was analyzed. Table 14 shows the results of composition changes during the transfer when the initial composition was adjusted to the target upper-limit composition.

TABLE 14

| HFC-32 target upper-limit composition (x) wt % | HFC-32 composition before transfer wt % | HFC-32 composition after extraction of liquid wt % | Gap from HFC-32 target upper-limit composition wt % |
| --- | --- | --- | --- |
| 90.0 | 90.0 | 88.9 | −1.1 |
| 80.0 | 80.0 | 78.0 | −2.0 |
| 70.0 | 70.0 | 67.3 | −2.7 |
| 64.5 | 64.5 | 61.5 | −3.0 |
| 27.5 | 27.5 | 24.5 | −3.0 |
| 20.0 | 20.0 | 17.5 | −2.5 |
| 10.0 | 10.0 | 8.6 | −1.4 |

As shown in Table 14, by adjusting the initial composition before transfer to the target upper-limit composition, the proportion of HFC-32 in the liquid phase falls within the range from the target upper-limit composition-3.0 wt % (target lower-limit composition) to the target upper-limit composition when the HFC-32 composition, among the compositions from the start of filling (before the transfer) until the entire liquid is extracted (until the transfer is completed), is within a range of 10 to 27.5 wt % or 64.5 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 15 shows the lower limit ($y_{Q2}$) of the gap between the target upper-limit composition and the initial composition in this case.

TABLE 15

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
| --- | --- | --- | --- |
| 90.0 | 88.3 | 87.0 | −1.7 |
| 81.5 | 80.5 | 78.5 | −1.0 |
| 71.5 | 71.2 | 68.6 | −0.3 |
| 64.5 | 64.5 | 61.5 | 0.0 |
| 27.5 | 27.5 | 24.5 | 0.0 |
| 21.5 | 21.1 | 18.5 | −0.4 |
| 11.5 | 10.0 | 8.6 | −1.5 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −1.7 wt % of the target upper-limit composition, the proportion of HFC-32 in the liquid phase falls within the range from the target upper-limit composition-3.0 wt % (target lower-limit composition) to the target upper-limit composition from before the transfer to the completion of the transfer.

Based on these results, the lower limit ($y_{Q2}$) of the gap between the target upper-limit composition and the initial composition is represented by the following equation using the target upper-limit composition (x):

$$1000y_{Q2}=0.0089x^3-2.69275x^2+188.6282x-3367.314 \quad (9)$$

By setting the lower limit ($y_{Q2}$) based on Table 15, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{Q2}$ to the target upper-limit composition, the proportion of HFC-32 in the liquid phase falls within the range from the target upper-limit composition-3.0 wt % (target lower-limit composition) to the target upper-limit composition from before the transfer to the completion of the transfer.

(3-3) Example 8

Initial Filling Amount in the Feeding Container: 80 wt % of the Maximum Filling Amount A 10-L hermetically sealed container was filled with HFO-1234ze(E) and HFC-32 in 80 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 6, the liquid phase was gradually transferred from the container to another empty container by using a pump, and the component composition was analyzed. Table 16 shows the results of composition changes during the transfer when the initial composition was adjusted to the target upper-limit composition.

TABLE 16

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 88.9 | -1.1 |
| 80.0 | 80.0 | 78.1 | -1.9 |
| 70.0 | 70.0 | 67.4 | -2.6 |
| 61.5 | 61.5 | 58.5 | -3.0 |
| 30.0 | 30.0 | 27.0 | -3.0 |
| 20.0 | 20.0 | 17.6 | -2.4 |
| 10.0 | 10.0 | 8.6 | -1.4 |

As shown in Table 16, by adjusting the initial composition before transfer to the target upper-limit composition, the proportion of HFC-32 in the liquid phase falls within the range from the target upper-limit composition-3.0 wt % (target lower-limit composition) to the target upper-limit composition when the HFC-32 composition, among the compositions from the start of filling (before the transfer) until the entire liquid is extracted (until the transfer is completed), is within a range of 10 to 30.0 wt % or 61.5 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 17 shows the lower limit ($y_{Q3}$) of the gap between the target upper-limit composition and the initial composition in this case.

TABLE 17

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
|---|---|---|---|
| 90.0 | 88.3 | 87.1 | -1.7 |
| 81.5 | 80.4 | 78.5 | -1.1 |
| 71.5 | 71.1 | 68.6 | -0.4 |
| 61.5 | 61.5 | 58.5 | 0.0 |
| 30.0 | 30.0 | 27.0 | 0.0 |
| 21.5 | 21.0 | 18.6 | -0.5 |
| 11.5 | 9.9 | 8.5 | -1.6 |
| 90.0 | 88.3 | 87.1 | -1.7 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is -1.7 wt % of the target upper-limit composition, the proportion of HFC-32 in the liquid phase falls within the range from the target upper-limit composition-3.0 wt % (target lower-limit composition) to the target upper-limit composition from before the transfer to the completion of the transfer.

Based on these results, the lower limit ($y_{Q3}$) of the gap between the target upper-limit composition and the initial composition is represented by the following equation using the target upper-limit composition (x):

$$1000y_{Q3}=0.0083x^3-2.54425x^2+180.1067x-3371.564 \quad (10)$$

By setting the lower limit ($y_{Q3}$) based on Table 17, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{Q3}$ to the target upper-limit composition, the proportion of HFC-32 in the liquid phase falls within the range from the target upper-limit composition-3.0 wt % (target lower-limit composition) to the target upper-limit composition from before the transfer to the completion of the transfer.

(3-4) Example 9

Initial Filling Amount in the Feeding Container: 70 wt % of the Maximum Filling Amount A 10-L hermetically sealed container was filled with HFO-1234ze(E) and HFC-32 in 70 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 6, the liquid phase was gradually transferred from the container to another empty container by using a pump, and the component composition was analyzed. Table 18 shows the results of composition changes during the transfer when the initial composition was adjusted to the target upper-limit composition.

TABLE 18

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 89.0 | −1.0 |
| 80.0 | 80.0 | 78.2 | −1.8 |
| 70.0 | 70.0 | 67.5 | −2.5 |
| 60.0 | 60.0 | 57.1 | −2.9 |
| 57.5 | 57.5 | 54.5 | −3.0 |
| 33.5 | 33.5 | 30.5 | −3.0 |
| 30.0 | 30.0 | 27.2 | −2.8 |
| 20.0 | 20.0 | 17.8 | −2.2 |
| 10.0 | 10.0 | 8.7 | −1.3 |

As shown in Table 18, by adjusting the initial composition before transfer to the target upper-limit composition, the proportion of HFC-32 in the liquid phase falls within the range from the target upper-limit composition-3.0 wt % (target lower-limit composition) to the target upper-limit composition when the HFC-32 composition, among the compositions from the start of filling (before the transfer) until the entire liquid is extracted (until the transfer is completed), is within a range of 10 to 33.5 wt % or 57.5 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 19 shows the lower limit ($y_{Q4}$) of the gap between the target upper-limit composition and the initial composition in this case.

TABLE 19

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
|---|---|---|---|
| 90.0 | 88.2 | 87.0 | −1.8 |
| 81.5 | 80.4 | 78.6 | −1.1 |
| 71.5 | 71.0 | 68.6 | −0.5 |
| 61.5 | 61.4 | 58.5 | −0.1 |
| 57.5 | 57.5 | 54.5 | 0.0 |
| 33.5 | 33.5 | 30.5 | 0.0 |
| 31.5 | 31.4 | 28.5 | −0.1 |
| 21.5 | 20.8 | 18.5 | −0.7 |
| 11.5 | 9.8 | 8.5 | −1.7 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −1.8 wt % of the target upper-limit composition, the proportion of HFC-32 in the liquid phase falls within the range from the target upper-limit composition-3.0 wt % (target lower-limit composition) to the target upper-limit composition from before the transfer to the completion of the transfer.

Based on these results, the lower limit ($y_{Q4}$) of the gap between the target upper-limit composition and the initial composition is represented by the following equation using the target upper-limit composition (x):

$$1000 y_{Q4} = 0.0074 x^3 - 2.3485 x^2 + 168.4156 x - 3324.164 \quad (11)$$

By setting the lower limit ($y_{Q4}$) based on Table 19, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{Q4}$ to the target upper-limit composition, the proportion of HFC-32 in the liquid phase falls within the range from the target upper-limit composition-3.0 wt % (target lower-limit composition) to the target upper-limit composition from before the transfer to the completion of the transfer.

(3-5) Example 10

Initial Filling Amount in the Feeding Container: 60 wt % of the Maximum Filling Amount A 10-L hermetically sealed container was filled with HFO-1234ze(E) and HFC-32 in 60 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 6, the liquid phase was gradually transferred from the container to another empty container by using a pump, and the component composition was analyzed. Table 20 shows the results of composition changes during the transfer when the initial composition was adjusted to the target upper-limit composition.

TABLE 20

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 89.0 | −1.0 |
| 80.0 | 80.0 | 78.3 | −1.7 |
| 70.0 | 70.0 | 67.7 | −2.3 |
| 60.0 | 60.0 | 57.3 | −2.7 |
| 50.0 | 50.0 | 47.0 | −3.0 |
| 40.0 | 40.0 | 37.1 | −2.9 |
| 30.0 | 30.0 | 27.3 | −2.7 |
| 20.0 | 20.0 | 17.9 | −2.1 |
| 10.0 | 10.0 | 8.8 | −1.2 |

As shown in Table 20, by adjusting the initial composition before transfer to the target upper-limit composition, the proportion of HFC-32 in the liquid phase falls within the range from the target upper-limit composition-3.0 wt % (target lower-limit composition) to the target upper-limit composition when the HFC-32 composition, among the compositions from the start of filling (before the transfer) until the entire liquid is extracted (until the transfer is completed), is within a range of 10 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 21 shows the lower limit ($y_{Q5}$) of the gap between the target upper-limit composition and the initial composition in this case.

TABLE 21

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
| --- | --- | --- | --- |
| 90.0 | 88.2 | 87.1 | −1.8 |
| 81.5 | 80.3 | 78.6 | −1.2 |
| 71.5 | 70.8 | 68.5 | −0.7 |
| 61.5 | 61.2 | 58.5 | −0.3 |
| 51.5 | 51.5 | 48.6 | 0.0 |
| 41.5 | 41.5 | 38.5 | 0.0 |
| 31.5 | 31.3 | 28.6 | −0.2 |
| 21.5 | 20.7 | 18.5 | −0.8 |
| 11.5 | 9.7 | 8.5 | −1.8 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −1.8 wt % of the target upper-limit composition, the proportion of HFC-32 in the liquid phase falls within the range from the target upper-limit composition-3.0 wt % (target lower-limit composition) to the target upper-limit composition from before the transfer to the completion of the transfer.

Based on these results, the lower limit ($y_{Q5}$) of the gap between the target upper-limit composition and the initial composition is represented by the following equation using the target upper-limit composition (x):

$$1000y_{Q5}=0.0070x^3-2.2222x^2+160.0194x-3342.253 \qquad (12)$$

By setting the lower limit ($y_{Q5}$) based on Table 21, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{Q5}$ to the target upper-limit composition, the proportion of HFC-32 in the liquid phase falls within the range from the target upper-limit composition-3.0 wt % (target lower-limit composition) to the target upper-limit composition from before the transfer to the completion of the transfer.

(4) Filling Method when the Gap Between the Target Upper-Limit Composition and the Target Lower-Limit Composition is 2 wt %

(4-1) Example 11

Initial Filling Amount in the Feeding Container: 100 wt % of the Maximum Filling Amount A 10-L hermetically sealed container was filled with HFO-1234ze(E) and HFC-32 in the maximum filling amount (100 wt % of the maximum filling amount) that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Reference Example 1, the liquid phase was gradually transferred from the container to another empty container by using a pump, and the component composition was analyzed. Table 22 shows the results of composition changes during the transfer when the initial composition was adjusted to the target upper-limit composition.

TABLE 22

| HFC-32 target upper-limit composition (x) wt % | HFC-32 composition before transfer wt % | HFC-32 composition after extraction of liquid wt % | Gap from HFC-32 target upper-limit composition wt % |
| --- | --- | --- | --- |
| 90.0 | 90.0 | 88.9 | −1.1 |
| 81.0 | 81.0 | 79.0 | −2.0 |
| 14.0 | 14.0 | 12.0 | −2.0 |
| 10.0 | 10.0 | 8.5 | −1.5 |

As shown in Table 22, by adjusting the initial composition before transfer to the target upper-limit composition, the proportion of HFC-32 in the liquid phase falls within the range from the target upper-limit composition-2.0 wt % (target lower-limit composition) to the target upper-limit composition when the HFC-32 composition, among the compositions from the start of filling (before the transfer) until the entire liquid is extracted (until the transfer is completed), is within a range of 10 to 14.0 wt % or 81.0 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 23 shows the lower limit ($y_{R1}$) of the gap between the target upper-limit composition and the initial composition in this case.

TABLE 23

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
| --- | --- | --- | --- |
| 90.0 | 89.3 | 88.1 | −0.7 |
| 81.0 | 81.0 | 79.0 | 0.0 |
| 14.0 | 14.0 | 12.0 | 0.0 |
| 11.0 | 10.6 | 9.0 | −0.4 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −0.7 wt % of the target upper-limit composition, the proportion of HFC-32 in the liquid phase falls within the range from the target upper-limit composition-2.0 wt % (target lower-limit composition) to the target upper-limit composition from before the transfer to the completion of the transfer.

Based on these results, the lower limit ($y_{R1}$) of the gap between the target upper-limit composition and the initial composition is represented by the following equation using the target upper-limit composition (x):

$$1000y_{R1}=0.0088x^3-2.6875x^2+186.3886x-2144.11 \qquad (14)$$

By setting the lower limit ($y_{R1}$) based on Table 23, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{R1}$ to the target upper-limit composition, the proportion of HFC-32 in the liquid phase falls within the range from the target upper-limit composition-2.0 wt % (target lower-limit composition) to the target upper-limit composition from before the transfer to the completion of the transfer.

(4-2) Example 12

Initial Filling Amount in the Feeding Container: 90 wt % of the Maximum Filling Amount A 10-L hermetically sealed container was filled with HFO-1234ze(E) and HFC-32 in 90 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 11, the liquid phase was gradually transferred from the container to another empty container by using a pump, and the component composition was analyzed. Table 24 shows the results of composition changes during the transfer when the initial composition was adjusted to the target upper-limit composition.

TABLE 24

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 88.9 | −1.1 |
| 80.5 | 80.5 | 78.5 | −2.0 |
| 14.5 | 14.5 | 12.5 | −2.0 |
| 10.0 | 10.0 | 8.6 | −1.4 |

As shown in Table 24, by adjusting the initial composition before transfer to the target upper-limit composition, the proportion of HFC-32 in the liquid phase falls within the range from the target upper-limit composition-2.0 wt % (target lower-limit composition) to the target upper-limit composition when the HFC-32 composition, among the compositions from the start of filling (before the transfer) until the entire liquid is extracted (until the transfer is completed), is within a range of 10 to 14.5 wt % or 80.5 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 25 shows the lower limit ($y_{R2}$) of the gap between the target upper-limit composition and the initial composition in this case.

TABLE 25

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
|---|---|---|---|
| 90.0 | 89.2 | 88.0 | −0.8 |
| 81.0 | 81.0 | 79.1 | 0.0 |
| 80.5 | 80.5 | 78.5 | 0.0 |
| 14.5 | 14.5 | 12.5 | 0.0 |
| 11.0 | 10.5 | 9.0 | −0.5 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −0.8 wt % of the target upper-limit composition, the proportion of HFC-32 in the liquid phase falls within the range from the target upper-limit composition-2.0 wt % (target lower-limit composition) to the target upper-limit composition from before the transfer to the completion of the transfer.

Based on these results, the lower limit ($y_{R2}$) of the gap between the target upper-limit composition and the initial composition is represented by the following equation using the target upper-limit composition (x):

$$1000 y_{R2} = 0.0085 x^3 - 2.6087 x^2 + 181.1319 x - 2166.072 \qquad (15)$$

By setting the lower limit ($y_{R2}$) based on Table 25, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{R2}$ to the target upper-limit composition, the proportion of HFC-32 in the liquid phase falls within the range from the target upper-limit composition-2.0 wt % (target lower-limit composition) to the target upper-limit composition from before the transfer to the completion of the transfer.

(4-3) Example 13

Initial Filling Amount in the Feeding Container: 80 wt % of the Maximum Filling Amount A 10-L hermetically sealed container was filled with HFO-1234ze(E) and HFC-32 in 80 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 11, the liquid phase was gradually transferred from the container to another empty container by using a pump, and the component composition was analyzed. Table 26 shows the results of composition changes during the transfer when the initial composition was adjusted to the target upper-limit composition.

TABLE 26

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 88.9 | −1.1 |
| 80.0 | 80.0 | 78.1 | −1.9 |
| 79.5 | 79.5 | 77.5 | −2.0 |
| 15.5 | 15.5 | 13.5 | −2.0 |
| 10.0 | 10.0 | 8.6 | −1.4 |

As shown in Table 26, by adjusting the initial composition before transfer to the target upper-limit composition, the proportion of HFC-32 in the liquid phase falls within the range from the target upper-limit composition-2.0 wt % (target lower-limit composition) to the target upper-limit composition when the HFC-32 composition, among the compositions from the start of filling (before the transfer) until the entire liquid is extracted (until the transfer is completed), is within a range of 10 to 15.5 wt % or 79.5 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 27 shows the lower limit ($y_{R3}$) of the gap between the target upper-limit composition and the initial composition in this case.

TABLE 27

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
|---|---|---|---|
| 90.0 | 89.2 | 88.1 | −0.8 |
| 81.0 | 80.9 | 79.2 | −0.1 |
| 79.5 | 79.5 | 79.0 | 0.0 |
| 15.5 | 15.5 | 77.5 | 0.0 |
| 11.0 | 10.5 | 13.5 | −0.5 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −0.9 wt % of the target upper-limit composition, the proportion of HFC-32 in the liquid phase falls within the range from the target upper-limit composition-2.0 wt % (target lower-limit composition) to the target upper-limit composition from before the transfer to the completion of the transfer.

Based on these results, the lower limit ($y_{R3}$) of the gap between the target upper-limit composition and the initial composition is represented by the following equation using the target upper-limit composition (x):

$$1000 y_{R3} = 0.0082 x^3 - 2.5108 x^2 + 174.097 x - 2167.464 \quad (16)$$

By setting the lower limit ($y_{R3}$) based on Table 27, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{R3}$ to the target upper-limit composition, the proportion of HFC-32 in the liquid phase falls within the range from the target upper-limit composition-2.0 wt % (target lower-limit composition) to the target upper-limit composition from before the transfer to the completion of the transfer.

(4-4) Example 14

Initial Filling Amount in the Feeding Container: 70 wt % of the Maximum Filling Amount A 10-L hermetically sealed container was filled with HFO-1234ze(E) and HFC-32 in 70 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 11, the liquid phase was gradually transferred from the container to another empty container by using a pump, and the component composition was analyzed. Table 28 shows the results of composition changes during the transfer when the initial composition was adjusted to the target upper-limit composition.

TABLE 28

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 89.0 | −1.0 |
| 80.0 | 80.0 | 78.2 | −1.8 |
| 78.0 | 78.0 | 76.0 | −2.0 |
| 16.0 | 16.0 | 14.1 | −1.9 |
| 10.0 | 10.0 | 8.7 | −1.3 |

As shown in Table 28, by adjusting the initial composition before transfer to the target upper-limit composition, the proportion of HFC-32 in the liquid phase falls within the range from the target upper-limit composition-2.0 wt % (target lower-limit composition) to the target upper-limit composition when the HFC-32 composition, among the compositions from the start of filling (before the transfer) until the entire liquid is extracted (until the transfer is completed), is within a range of 10 to 16.0 wt % or 78.0 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 29 shows the lower limit ($y_m$) of the gap between the target upper-limit composition and the initial composition in this case.

TABLE 29

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
|---|---|---|---|
| 90.0 | 89.1 | 88.0 | −0.9 |
| 81.0 | 80.8 | 79.0 | −0.2 |
| 78.0 | 78.0 | 76.0 | 0.0 |
| 16.0 | 15.9 | 14.0 | −0.1 |
| 11.0 | 10.4 | 9.1 | −0.6 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −0.9 wt % of the target upper-limit composition, the proportion of HFC-32 in the liquid phase falls within the range from the target upper-limit composition-2.0 wt % (target lower-limit composition) to the target upper-limit composition from before the transfer to the completion of the transfer.

Based on these results, the lower limit ($y_{R4}$) of the gap between the target upper-limit composition and the initial composition is represented by the following equation using the target upper-limit composition (x):

$$1000 y_{R4} = 0.0074 x^3 - 2.3367 x^2 + 164.5012 x - 2176.172 \quad (17)$$

By setting the lower limit ($y_{R4}$) based on Table 29, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_m$ to the target upper-limit composition, the proportion of HFC-32 in the liquid phase falls within the range from the target upper-limit composition-2.0 wt % (target lower-limit composition) to the target upper-limit composition from before the transfer to the completion of the transfer.

(4-5) Example 15

Initial Filling Amount in the Feeding Container: 60 wt % of the Maximum Filling Amount A 10-L hermetically sealed container was filled with HFO-1234ze(E) and HFC-32 in 60 wt % of the maximum filling amount that could be filled with the composition before transfer so that the liquid phase had a fixed composition at 40° C., and the container was maintained at 40° C. In this case, the initial composition of HFC-32 in the liquid phase before the transfer was adjusted to the target upper-limit composition. Subsequently, as in Example 11, the liquid phase was gradually transferred from the container to another empty container by using a pump, and the component composition was analyzed. Table 30 shows the results of composition changes during the transfer when the initial composition was adjusted to the target upper-limit composition.

TABLE 30

| HFC-32 target upper-limit composition (x) wt % | HFC-32 composition before transfer wt % | HFC-32 composition after extraction of liquid wt % | Gap from HFC-32 target upper-limit composition wt % |
|---|---|---|---|
| 90.0 | 90.0 | 89.0 | −1.0 |
| 80.0 | 80.0 | 78.3 | −1.7 |
| 76.0 | 76.0 | 74.0 | −2.0 |
| 18.0 | 18.0 | 16.0 | −2.0 |
| 10.0 | 10.0 | 8.8 | −1.2 |

As shown in Table 30, by adjusting the initial composition before transfer to the target upper-limit composition, the proportion of HFC-32 in the liquid phase falls within the range from the target upper-limit composition-2.0 wt % (target lower-limit composition) to the target upper-limit composition when the HFC-32 composition, among the compositions from the start of filling (before the transfer) until the entire liquid is extracted (until the transfer is completed), is within a range of 10 to 18.0 wt % or 76.0 to 90 wt % in the HFC-32/HFO-1234ze(E) refrigerant mixture in the liquid phase.

Moreover, the HFC-32 composition in the HFC-32/HFO-1234ze(E) refrigerant mixture in the liquid phase before the transfer that enabled the HFC-32 composition at the time of the completion of the transfer to be the target lower-limit composition was determined. Table 31 shows the lower limit ($y_{R5}$) of the gap between the target upper-limit composition and the initial composition in this case.

TABLE 31

| HFC-32 target upper-limit composition (x) wt % | HFC-32 composition before transfer wt % | HFC-32 composition after extraction of liquid wt % | Lower limit of gap between target upper-limit composition and initial composition of HFC-32 wt % |
|---|---|---|---|
| 90.0 | 89.1 | 88.1 | −0.9 |
| 81.0 | 80.7 | 79.0 | −0.3 |
| 76.0 | 76.0 | 74.0 | 0.0 |
| 18.0 | 18.0 | 16.0 | 0.0 |
| 11.0 | 10.3 | 9.0 | −0.7 |

The results show that HFC-32 undergoes the least composition change when the target upper-limit composition is 90 wt %, and that even when the initial composition of HFC-32 in the HFC-32/HFO-1234ze(E) refrigerant mixture in the liquid phase is −0.9 wt % of the target upper-limit composition, the proportion of HFC-32 in the liquid phase falls within the range from the target upper-limit composition-2.0 wt % (target lower-limit composition) to the target upper-limit composition from before the transfer to the completion of the transfer.

Based on these results, the lower limit ($y_{R5}$) of the gap between the target upper-limit composition and the initial composition is represented by the following equation using the target upper-limit composition (x):

$$1000 y_{R5} = 0.0065 x^3 - 2.1408 x^2 + 153.3221 x - 2164.988 \quad (18)$$

By setting the lower limit ($y_{R5}$) based on Table 31, any target upper-limit composition allows all of the compositions from the start to the completion of the transfer to fall within the range from the target lower-limit composition to the target upper-limit composition.

Therefore, when the initial composition of HFC-32 in the HFC-32/HFO-1234ze(E) refrigerant mixture in the liquid phase is adjusted within the range from $y_{R5}$ to the target upper-limit composition, the proportion of HFC-32 in the liquid phase falls within the range from the target upper-limit composition-2.0 wt % (target lower-limit composition) to the target upper-limit composition from before the transfer to the completion of the transfer.

(5) Discussion

As is clear from the results of the above Examples, the present invention provides a novel method for filling a non-azeotropic refrigerant mixture that enables composition changes associated with the transfer of the refrigerant mixture to fall within a fixed range of the target composition from before the transfer to the completion of the transfer, as compared to when the refrigerant mixture is transferred without taking any measures, and that also enables the use of the entire amount of the liquid phase.

Performing the method of the present invention leads to a significant result in which composition changes that occur during the transfer of a non-azeotropic HFO-1234ze(E)/HFC-32 refrigerant mixture, which is used as a working medium for a vapor compression refrigeration cycle, fall within a range that does not impair refrigerant capacity.

The invention claimed is:

1. A method for filling a refrigerant mixture comprising difluoromethane and trans-1,3,3,3-tetrafluoropropene, the difluoromethane being present in a liquid phase of the refrigerant mixture in an amount of 10 to 90 wt % based on 100 wt % of the total of the difluoromethane and trans-1,3,3,3-tetrafluoropropene, the method comprising, in transferring the refrigerant mixture in a liquid state to a target container or equipment from a feeding container, adjusting the proportion (initial composition) of the difluoromethane in the liquid phase of the refrigerant mixture in the feeding container immediately before the transfer to $x+y_1$ (minimum value) to x wt % (target upper-limit composition), so that the proportion of the difluoromethane in the liquid phase of the refrigerant mixture in the feeding container falls within a range from the target upper-limit composition (x) of the difluoromethane to the target upper-limit composition (x)—4.0 wt % (target lower-limit composition) during initiation and completion of the transfer, a: an amount (wt %) initially filled in the feeding container ($60 \leq a \leq 100$);

x: a target upper-limit composition with the proviso that $10 \leq x \leq 90$, excluding a range satisfying an inequality: $y_1 > 0$; and $y_1$: a lower limit of a gap between the target upper-limit composition and the initial composition, $y_1$ being represented by Equation (1) below:

$$1000y_1 = L_1 x^3 - M_1 x^2 + N_1 x - P_1 \tag{1}$$

$L_1 = 0.0006\ a + 0.0033$
$M_1 = 0.0147\ a + 1.3904$
$N_1 = 0.9026\ a + 112.55$
$P_1 = 1.1469\ a + 4464$.

2. A method for filling a refrigerant mixture comprising difluoromethane and trans-1,3,3,3-tetrafluoropropene, the difluoromethane being present in a liquid phase of the refrigerant mixture in an amount of 10 to 90 wt % based on 100 wt % of the total of the difluoromethane and trans-1,3,3,3-tetrafluoropropene, the method comprising, in transferring the refrigerant mixture in a liquid state to a target container or equipment from a feeding container, adjusting the proportion (initial composition) of the difluoromethane in the liquid phase of the refrigerant mixture in the feeding container immediately before the transfer to $x+y_2$ (minimum value) to x wt % (target upper-limit composition), so that the proportion of the difluoromethane in the liquid phase of the refrigerant mixture in the feeding container falls within a range from the target upper-limit composition (x) of the difluoromethane to the target upper-limit composition (x)—3.0 wt % (target lower-limit composition) during initiation and completion of the transfer, a: an amount (wt %) initially filled in the feeding container ($60 \leq a \leq 100$);

x: a target upper-limit composition with the proviso that $10 \leq x \leq 90$, excluding a range satisfying an inequality: $y_2 > 0$; and $y_2$: a lower limit of a gap between the target upper-limit composition and the initial composition, $y_2$ being represented by Equation (7) below:

$$1000y_2 = L_2 x^3 - M_2 x^2 + N_2 x - P_2 \tag{7}$$

$L_2 = 0.0006\ a + 0.0033$
$M_2 = 0.0149\ a + 1.3265$
$N_2 = 0.9005\ a + 106.38$
$P_2 = 0.8193\ a + 3287.8$.

3. A method for filling a refrigerant mixture comprising difluoromethane and trans-1,3,3,3-tetrafluoropropene, the difluoromethane being present in a liquid phase of the refrigerant mixture in an amount of 10 to 18.0 wt % or 76.0 to 90 wt % based on 100 wt % of the total of the difluoromethane and trans-1,3,3,3-tetrafluoropropene, the method comprising, in transferring the refrigerant mixture in a liquid state to a target container or equipment from a feeding container, adjusting the proportion (initial composition) of the difluoromethane in the liquid phase of the refrigerant mixture in the feeding container immediately before the transfer to $x+y_3$ (minimum value) to x wt % (target upper-limit composition), so that the proportion of the difluoromethane in the liquid phase of the refrigerant mixture in the feeding container falls within a range from the target upper-limit composition (x) of the difluoromethane to the target upper-limit composition (x)—2.0 wt % (target lower-limit composition) during initiation and completion of the transfer, a: an amount (wt %) initially filled in the feeding container ($60 \leq a \leq 100$);

x: a target upper-limit composition with the proviso that $10 \leq x \leq 18.0$ wt % or $76.0 \leq x \leq 90$ wt %, excluding a range satisfying an inequality: $y_3 > 0$; and $y_3$: a lower limit of a gap between the target upper-limit composition and the initial composition, $y_3$ being represented by Equation (13) below:

$$1000y_3 = L_3 x^3 - M_3 x^2 + N_3 x - P_3 \tag{13}$$

$L_3 = 0.0006\ a + 0.0033$
$M_3 = 0.0137\ a + 1.3646$
$N_3 = 0.8276\ a + 105.68$
$P_3 = -0.5186\ a + 2205.2$.

* * * * *